United States Patent
Morinaga et al.

(10) Patent No.: US 7,206,175 B2
(45) Date of Patent: Apr. 17, 2007

(54) MAGNETORESISTIVE HEAD HAVING DEFINED RELATIONSHIPS BETWEEN THE TRACT WIDTH AND MAGNETIZATION FILM THICKNESS PRODUCT TO PERMIT NO HYSTERESIS IN THE TRANSFER CURVE

(75) Inventors: Akira Morinaga, Fujisawa (JP); Chiaki Ishikawa, Fujisawa (JP); Norifumi Miyamoto, Fujisawa (JP)

(73) Assignee: Hitachi Global Storage Technologies Japan, Ltd., Odawara (JP)

( * ) Notice: Subject to any disclaimer, the term of this patent is extended or adjusted under 35 U.S.C. 154(b) by 475 days.

(21) Appl. No.: 10/786,270

(22) Filed: Feb. 24, 2004

(65) Prior Publication Data

US 2004/0174640 A1    Sep. 9, 2004

(30) Foreign Application Priority Data

Mar. 7, 2003    (JP)    ............................. 2003-060791

(51) Int. Cl.
   *G11B 5/39*    (2006.01)
(52) U.S. Cl. ................................. 360/324.12
(58) Field of Classification Search ...................... None
   See application file for complete search history.

(56) References Cited

U.S. PATENT DOCUMENTS

| 4,663,685 | A | 5/1987 | Tsang |
| 5,018,037 | A | 5/1991 | Krounbi et al. |
| 6,714,388 | B2 * | 3/2004 | Hasegawa et al. ..... 360/324.11 |
| 6,807,033 | B2 * | 10/2004 | Zhu .......................... 360/324 |
| 6,982,932 | B2 * | 1/2006 | Sakakima et al. ....... 369/13.17 |
| 2003/0053269 | A1 * | 3/2003 | Nishiyama ............... 360/324.1 |

FOREIGN PATENT DOCUMENTS

JP    11-273030    10/1999

* cited by examiner

*Primary Examiner*—A. J. Heinz
(74) *Attorney, Agent, or Firm*—Townsend and Townsend and Crew LLP

(57) ABSTRACT

In a narrow magnetoresistive head having a magnetic domain control film comprising a single layer of magnetic film or magnetic films antiferromagnetically coupled by means of a nonmagnetic member, it has been found that the magnetic domain can be controlled with a smaller magnetization film thickness product than anticipated so far and the range is defined relative to the geometrical track width in the present invention. By defining the magnetization film thickness product of the magnetic domain control film within a prescribed range of the invention, a magnetic head having higher output than usual and having stable output with no hysteresis in the transfer curve and with no output fluctuation can be attained.

15 Claims, 15 Drawing Sheets

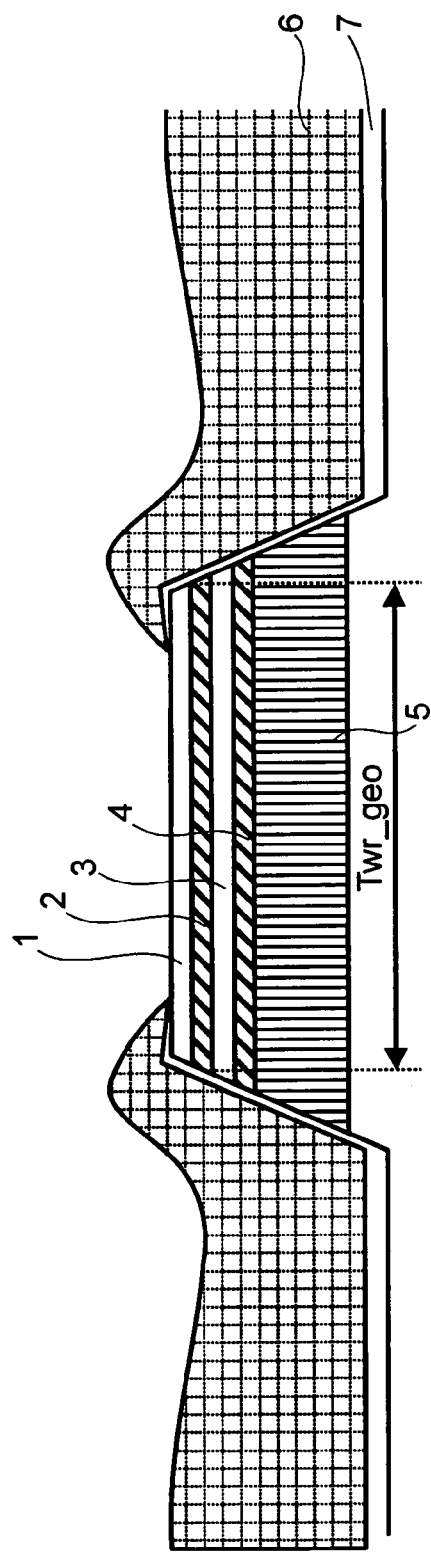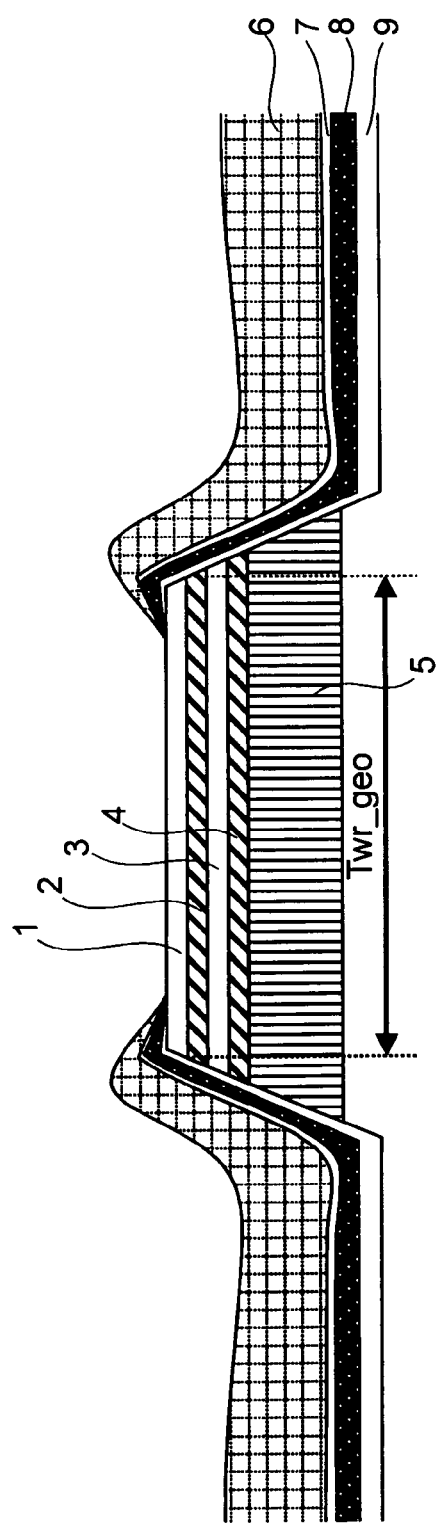

MAGNETORESISTIVE HEAD HAVING DEFINED RELATIONSHIPS BETWEEN THE TRACT WIDTH AND MAGNETIZATION FILM THICKNESS PRODUCT TO PERMIT NO HYSTERESIS IN THE TRANSFER CURVE

CROSS-REFERENCE TO RELATED APPLICATION

This application claims priority from Japanese Application No.2003-060791, filed Mar. 7, 2003, the entire disclosure of which is incorporated by reference for all purposes.

BACKGROUND OF THE INVENTION

The present invention relates to magnetoresistive heads for reading information from a magnetic recording medium.

The following patent documents are referred to below by ordinal number, and are hereby incorporated by reference:
1. Japanese Patent Laid-open Hei 3-125311;
2. U.S. Pat. No. 4,663,685; and
3. Japanese Patent Laid-open Hei 11-273030

In a hard disk drive (HDD), a magnetic head is used for reading information on a magnetic recording medium (i.e., a hard disk) or for writing information. The magnetic head comprises a write head for writing information as magnetization signals to a magnetic recording medium and a read head for reading signals recorded as magnetization signals in the magnetic recording medium. The read head comprises a magnetoresistive stack having a multiplicity of magnetic thin films and nonmagnetic thin films and is referred to as a magnetoresistive head since the device reads signals by utilizing the magnetoresistive effect. The magnetoresistive head has several types of stacked structures which are classified, for example, as AMR head, GMR head, CPP-GMR head and TMR head in view of the principle of magnetic resistance used therefor. They takeout input magnetic fields entered from a magnetic recording medium to a read head as a change of voltage by using AMR (magnetoresistive effect), GMR (Giant Magnetoresistive effect), CPP-GMR effect (Current Perpendicular Plane GMR effect) and TMR (Tunnel Magnetoresistive effect), respectively.

In the magnetoresistive stack of a magnetoresistive head, a magnetic layer in which the magnetization rotates in response to the input magnetic field from the magnetic recording medium is referred to as a free layer. To suppress various kinds of noise such as Barkhausen noise or to control the asymmetry of output, it is important to make the free layer into a single magnetic domain in the direction of track width. When the free layer is not formed into a single magnetic domain and has magnetic domains, magnetic wall movement occurs in response to the input magnetic fields from the magnetic recording medium, causing noise.

Examples of methods of magnetic domain control for making the free layer into a single magnetic domain include a method, as shown in Patent Document 1 for example, of disposing magnetic domain control films comprising a magnetic film on both ends of the free layer and using the magnetic field in the direction of track width generated from the magnetic films. FIG. 10 shows a schematic view of a magnetoresistive head, as viewed from an air bearing surface, subjected to magnetic domain control by this method. A free layer 2 is disposed by way of a nonmagnetic layer 3 above a soft magnetic film 4 (referred to as a pinned layer) in which magnetization is fixed by an antiferromagnetic film 5 and a cap layer 1 is put on free layer 2 in order to prevent it from oxidation. The width of free layer 2 is referred to as a geometrical track width Twr_geo.

Both ends of the magnetoresistive stack comprising layers 1 to 5 are etched by milling or the like to show a trapezoidal device shape viewed from the air-bearing surface as shown in FIG. 10. The structure has a feature by which magnetic domain control films 8 each comprising a magnetic film are disposed at both ends of the device by an underlying film 9. Electrodes 6 are stacked by means of an underlying layer film 7 above the magnetic domain control films. In this structure, the magnetization distribution in free layer 2 is controlled using a magnetic field generated by magnetic domain control films 8 to make the free layer into a single magnetic domain.

Further, another magnetic domain control method includes, for example, a method of stacking antiferromagnetic films on both ends of a long free layer and using exchange coupling between the antiferromagnetic film and the free layer as disclosed in Patent Document 2. FIG. 11 shows a schematic view of a magnetoresistive head subjected to magnetic domain control as viewed from an air-bearing surface. The structure has a feature where a free layer 2 is disposed by means of a nonmagnetic layer 3 above a soft magnetic film 4 (referred to as a pinned layer) in which magnetization is fixed by an antiferromagnetic film 5, and antiferromagnetic films 12 are stacked on both ends of free layer 2. Magnetic domain control is performed by exchange interaction between antiferromagnetic film 12 and free layer 2. Free layer 2 is made larger than the track width written on a magnetic recording medium and the end region is fixed. Accordingly, in this structure, recording is read by a portion (referred to as a magnetically sensitive portion) Tw of the free layer between the antiferromagnetic films. Electrode films 10 are stacked by means of an underlayer film 11 above antiferromagnetic film 12. Underlying film 11 may be saved.

Since the latter method of using the antiferromagnetic field is extremely difficult in view of the process of stacking the antiferromagnetic films on both ends of the free layer, the former method of using the magnetic films is generally used at present.

FIG. 10 shows the magnetic domain control system in which the magnetic domain control films are disposed on both ends of the free layer. In this system, if the magnetic domain control force is increased to ensure the stability of a device output, the magnetic field intensity at the ends where the magnetic domain control film is in contact with the free layer is excessively strong. Consequently, a region is increased where the magnetization of the free layer tends to be rotated less, relative to the magnetic film medium. That is, the dead zone is increased. The dead zone region can be decreased simply by weakening the magnetic domain control force, for example, by merely decreasing the film thickness. In this case, however, since this results in disadvantages such as generation of Barkhausen noise, generation of waveform fluctuations caused by hysteresis in transfer curves or increase in output asymmetry, appropriate magnetic domain control force is necessary. The transfer curve shows the relation between the magnitude of the input magnetic field and the head output, which expresses basic input/output characteristics of the magnetic head. The output changes must be linearly relative to the input magnetic field. Accordingly, a desirable transfer curve is linear.

When using the magnetic domain control system to dispose magnetic domain control films on both sides of the free layer as shown in FIG. 10, it is necessary to make the gradient of the transfer curve abrupt while keeping the linearity of the transfer curve. For this purpose, it is necessary to optimize the magnetization film thickness product of the control film. For example, as shown in Patent Document 3, there is a method of setting the residual magnetization film thickness product of a permanent magnetic film in accordance with values for the read track width, the read gap film thickness and the saturated magnetization film thickness product of the magnetic sensitizing layer. Definition for the magnetization ratio in Patent Document 3 concerns an MR head having a soft adjacent layer (SAL) film in which a calculation model is prepared based on experimental values using an MR head with a track width of 500 nm or more and the result is put in to obtain a mathematical formula. Accordingly, it is difficult to apply the definition to a narrow track magnetoresistive GMR head.

In recently produced magnetic head layers, the track width is extremely narrow and the entire free layer tends to be easily and uniformly rotated by exchange coupling. In addition, the magnetic domain control magnetic field is applied not only to a portion of the layer in the vicinity of the magnetic domain control film but to the entire free layer. It is therefore necessary to strictly determine the magnetic film thickness product.

SUMMARY OF THE INVENTION

According to an aspect of the present invention, it has been found that magnetic domain can be controlled by a magnetization film thickness product smaller than that assumed so far in a narrow track magnetoresistive head having a magnetic domain control film comprising a single layer of magnetic film or a plurality of magnetic films antiferromagnetically coupled by means of one or more nonmagnetic films, and the range is defined for a geometrical track width. By defining the magnetization film thickness product for the magnetic domain control film within a prescribed range of the invention, it is possible to provide a magnetic head having higher output than usual and having stable output with no hysteresis in transfer curves and with no output fluctuation.

In one aspect of the invention, a magnetoresistive head comprises an antiferromagnetic layer, a pinned layer formed on the antiferromagnetic layer with a magnetizing direction of the pinned layer being fixed, a nonmagnetic layer formed on the pinned layer, a free layer formed on the nonmagnetic layer, a magnetic domain control film for magnetic domain control of the free layer, and a pair of electrode films for supplying electric current to a stack of the antiferromagnetic layer, the pinned layer, the nonmagnetic layer, and the free layer. The magnetic domain control film is characterized by a magnetization film thickness product, designated Br·t, and the free layer is characterized by a geometrical track width, designated Twr_geo, as viewed from an air bearing surface. In various embodiments, Br·t and Twr_geo satisfy certain relationships. For simplicity in the different equations, Twr_geo is designated as the variable x, and the numerical quantities assume that Twr_geo is expressed in nanometers (nm) and Br·t is expressed in gauss-micrometers (G·μm).

In one embodiment, Br·t and Twr_geo satisfy the following:

$-2.94 \cdot 10^{-4} x^3 + 8.54 \cdot 10^{-2} x^2 - 5.73x + 116 \leq Br \cdot t < 3.75 \cdot 10^{-1} x + 130$ and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 116 \leq Br \cdot t \leq -2.94 \cdot 10^{-4} x^3 + 8.54 \cdot 10^{-2} x^2 - 5.73x + 141$, $Br \cdot t < 3.75 \cdot 10^{-1} x + 130$, and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 151 \leq Br \cdot t < 3.75 \cdot 10^{-1} x + 165$ and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 151 \leq Br \cdot t \leq -2.94 \cdot 10^{-4} x^3 + 8.54 \cdot 10^{-2} x^2 - 5.73x + 176$, $Br \cdot t < 3.75 \cdot 10^{-1} x + 165$, and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 116 \leq Br \cdot t < 3.75 \cdot 10^{-1} x + 130$ and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 116 \leq Br \cdot t \leq -2.94 \cdot 10^{-4} x^3 + 8.54 \cdot 10^{-2} x^2 - 5.73x + 141$, $Br \cdot t < 3.75 \cdot 10^{-1} x + 130$, and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 151 \leq Br \cdot t < 3.75 \cdot 10^{-1} x + 165$ and $40 \leq x < 160$.

In another embodiment, Br·t and Twr_geo satisfy the following:

$-2.94 \cdot 10^{-4} x^3 + 8.54 \cdot 10^{-2} x^2 - 5.73x + 151 \leq Br \cdot t \leq -2.94 \cdot 10^{-4} x^3 + 8.54 \cdot 10^{-2} x^2 - 5.73x + 176$, $Br \cdot t < 3.75 \cdot 10^{-1} x + 165$, and $40 \leq x < 160$.

A further understanding of the nature and advantages of the present invention may be realized by reference to the remaining portions of the specification and the drawings.

BRIEF DESCRIPTION OF THE DRAWINGS

FIG. 16 is a view showing a head structure (a track width is less than 40 nm) in a ninth embodiment of the invention; and FIG. 17 is a view showing a head structure (a track width is less than 40 nm) in a tenth embodiment of the invention.

DESCRIPTION OF SPECIFIC EMBODIMENTS

Preferred embodiments of a magnetic domain control system in a magnetoresistive head according to the present invention are described below with reference to the drawings.

Embodiment 1

Figure 3:
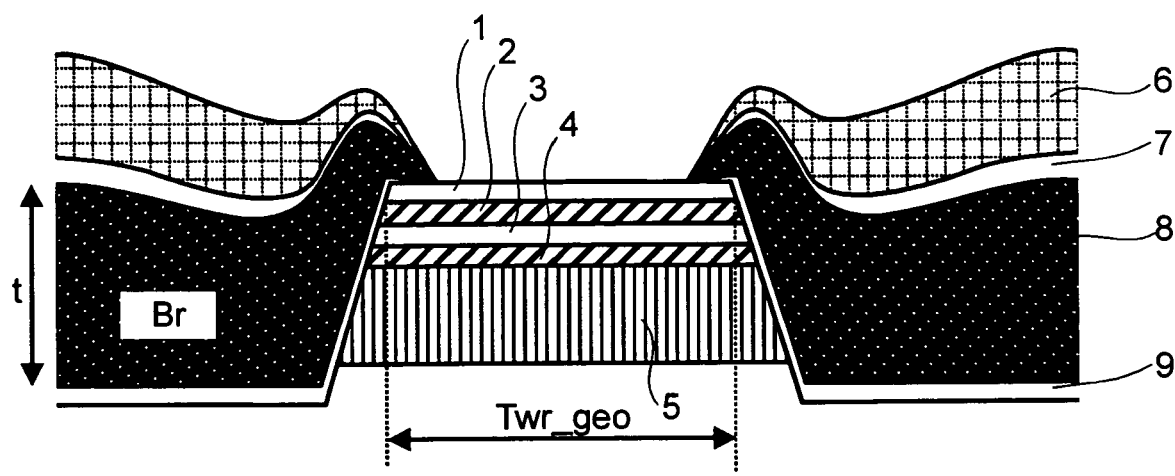
FIG. 3 shows a structure of a bottom type magnetoresistive device, in which an antiferromagnetic film is situated below the free layer in the first to fourth embodiments of the invention, as viewed from an air-bearing surface.

FIG. 3 shows a magnetoresistive device according to Embodiment 1 of the present invention as viewed from an air-bearing surface. A free layer 2 is disposed by way of a nonmagnetic layer 3 above a soft magnetic film 4 (referred to as a pinned layer) in which the magnetization is fixed by an antiferromagnetic film 5, and a cap layer 1 is provided on free layer 2 to prevent it from oxidation. The width of free layer 2 is referred to as a geometrical track width Twr_geo. Both ends of a magnetoresistive stack comprising layers 1 to 5 are etched by milling or the like and the device has a trapezoidal shape as viewed from the air-bearing surface as shown in FIG. 3. Magnetic domain control films 8 each comprising a magnetic film are disposed on both ends of the device by means of underlying films 9.

It is preferred that the magnetic domain control film has a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. The elements and the ratio thereof can be determined by an energy-dispersion-type X-ray analyzer (EDX), based on which a Br value (residual magnetic flux density or remanence) can be estimated. The thickness of the magnetic domain control film has a distribution depending on the resist shape or a film deposition apparatus such as IBD. In addition, the film is shaped so that the thickness is uniform in a portion remote from the device but decreased in the vicinity of the device and so that it rides over the upper portion of the magnetoresistive stack. The thickness t of the magnetic domain control film is defined herein as a film thickness for a uniform portion which is remote enough from the device. The film thickness can be confirmed by a scanning electron microscope (SEM) or transmission electron microscope (TEM).

Figure 5:
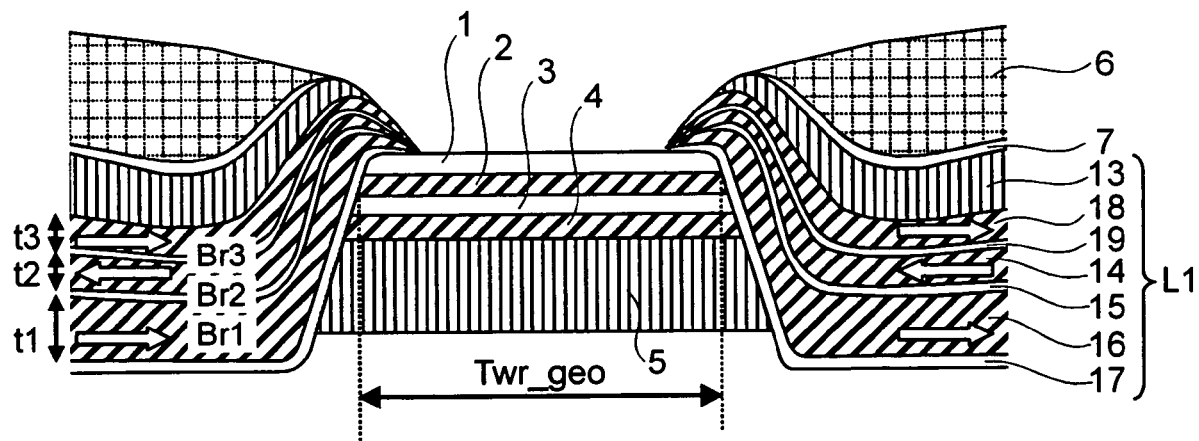
FIG. 5 shows a structure of a bottom type magnetoresistive device, in which an antiferromagnetic film is situated below the free layer and a magnetic domain control film comprising stacked films, in other first to fourth embodiments of the invention as viewed from an air-bearing surface.

The magnetic domain control film may not be only a single layer structure as shown in FIG. 3 but may also be a structure as shown in FIG. 5 that controls a magnetic domain by a magnetic control domain stack L1 comprising two or three layers of magnetic films antiferromagnetically coupled by means of nonmagnetic films. In FIG. 5, although the device has a trapezoidal shape like that in FIG. 3, magnetic films 16 are disposed by means of underlying layers 17 on both ends thereof, above which magnetic films 14 are disposed by way of nonmagnetic films 15. Nonmagnetic films 19 are stacked on the magnetic films 14, on which magnetic films 18 are further stacked.

Antiferromagnetic films 13 are disposed above magnetic films 18 in order to fix the magnetizing direction of magnetic films 18 in one direction. However, use of antiferromagnetic film 13 may be saved by considering the conditions for magnetization and the like. Electrode layers 6 are disposed above the magnetic domain control films (or stacks) by way of underlying layers 7. Underlying layer 7 may be saved. Magnetic domain control for the free layer is conducted by the magnetic domain control stack L1 comprising the layers 13 to 19.

Each of magnetic film 14, magnetic film 16 and magnetic film 18 is a magnetic film having a soft magnetic property containing Fe or Ni, or a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. Each of nonmagnetic film 15 and nonmagnetic film 19 is characterized by comprising Ru, Cr, Ir, Rh, Os, Re, Au, Ag, Cu, or an alloy thereof. Magnetic film 16 and magnetic film 14 are antiferromagnetically coupled by means of nonmagnetic film 15. Magnetic film 14 and magnetic film 18 are antiferromagnetically coupled by means of nonmagnetic film 19. Magnetic film 18 may be magnetized in the direction identical with the direction along which a final magnetic domain control field is applied or magnetization may be aligned in direction by antiferromagnetic film 13. Thus, magnetic film 14 is coupled in a counter-parallel manner and, further, magnetic film 16 closest to the magnetoresistive stack is coupled in a counter-parallel manner, to control the magnetic domain, thereby enabling magnetic domain control for the free layer.

When using the magnetic domain control film stack L1, the magnetization film thickness product is defined by means of a magnetization film thickness product of each of the magnetic films constituting the stack. A sum is taken when the two magnetic films are coupled in parallel, while a difference is taken when they are in counter-parallel. For example, in the case of FIG. 5, assuming that the residual magnetic flux density of the three layers of magnetic films constituting L1 are Br1, Br2 and Br3, respectively, and those film thicknesses are t1, t2, and t3, respectively and that magnetization is directed as shown by arrows in the drawing, Br·t=Br1·t1−Br2·t2+Br3·t3. It is further assumed that t or t1, t2, t3 is a thickness for a portion that is remote enough from the device and where the thickness is constant.

The read head is an electromagnetic transducer for converting an input magnetic field from a magnetic recording medium into voltage. When a transfer curve is measured and when hysteresis or jump is generated on this curve to degrade its linearity, output is separated into two systems relative to the input and waveform fluctuation or asymmetry abnormality of output results. The transfer curve represents a relation between the magnitude of the input magnetic field and the head output, namely, the basic input/output characteristic of the magnetic head. Hysteresis or jump is caused in the transfer curve depending, particularly, on the magnetization state of free layer 2 at the end in contact with magnetic domain control film 8. Then, the magnetization distribution of the free layer when the condition for magnetic domain control is changed is determined based on numerical value calculation.

Figure 7:
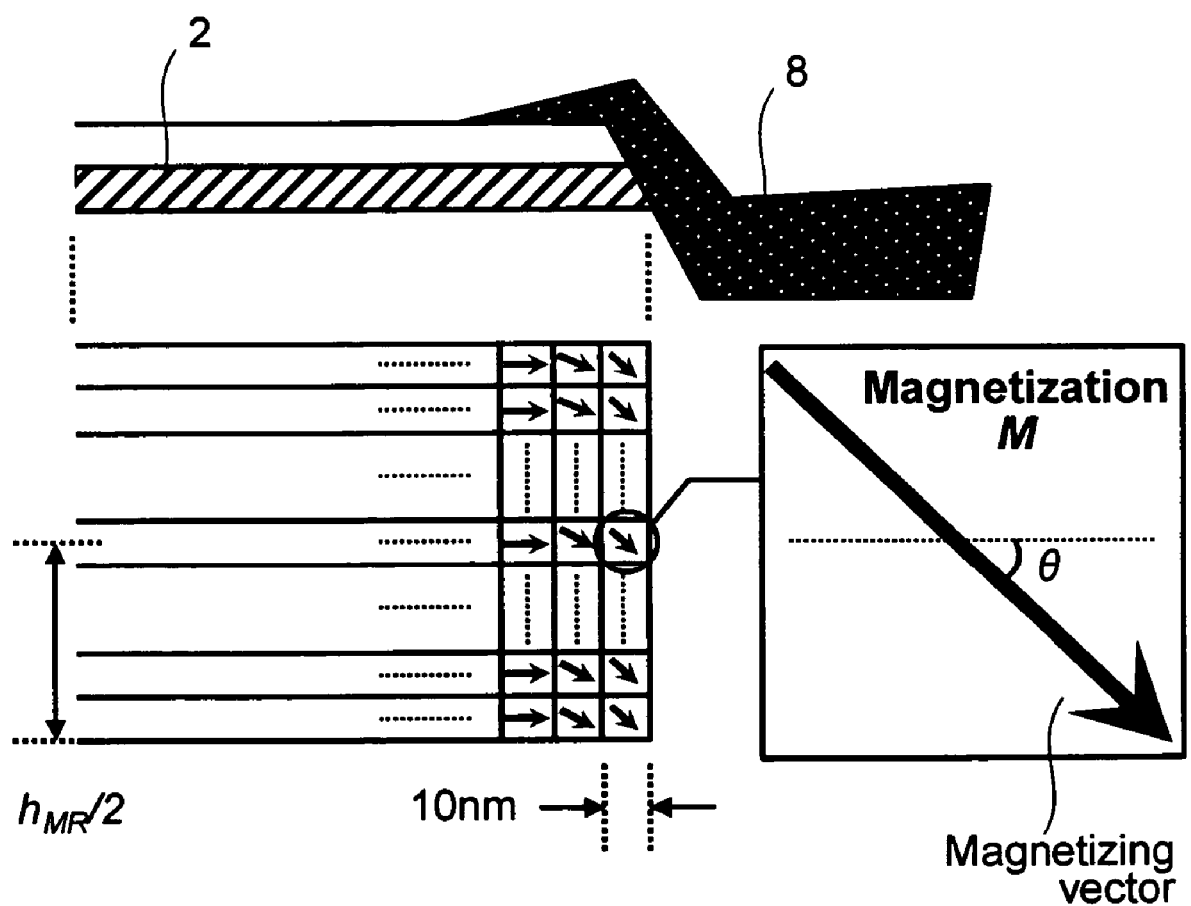
FIG. 7 provides a schematic diagram of a magnetoresistive device as viewed from an air-bearing surface, and a diagram for explaining a calculation model for a free layer partitioned into fine cells and the definition for Mx as the stability index of output.

FIG. 7 simply explains a calculation model. An upper part in FIG. 7 is an enlarged view for a right side portion of a magnetoresistive head as viewed from the air-bearing surface and a lower part in FIG. 7 is a schematic view of free layer 2 as viewed from above (on the side of cap layer 1), in which small squares each represents a calculation cell. As shown in the figure, free layer 2 is sectioned into calculation cells each of 10 nm square and magnetization distribution inside the free layer is calculated. In this case, magnetization for a portion spaced 10 nm apart from the end of free layer 2 and at a position of $H_{MR}/2$ or just one-half of the device height $H_{MR}$ is noted and cos θ of magnetization is defined as Mx for the angle θ formed relative to the direction of the geometrical track width Twr_geo in the absence of input magnetic field. When a bias from magnetic domain control film 8 is applied appropriately, magnetization is aligned in the track width direction to make the portion into a single magnetic domain, where Mx approaches 1. When the bias is not applied appropriately, magnetization is directed to the direction of the device height $h_{MR}$ mainly by the demagnetization of free layer 2. As a result, Mx decreases and it goes to zero when completely directed to the device height. A free layer is made into a single magnetic domain when Mx is large and has a distribution when Mx is small.

Figure 8:
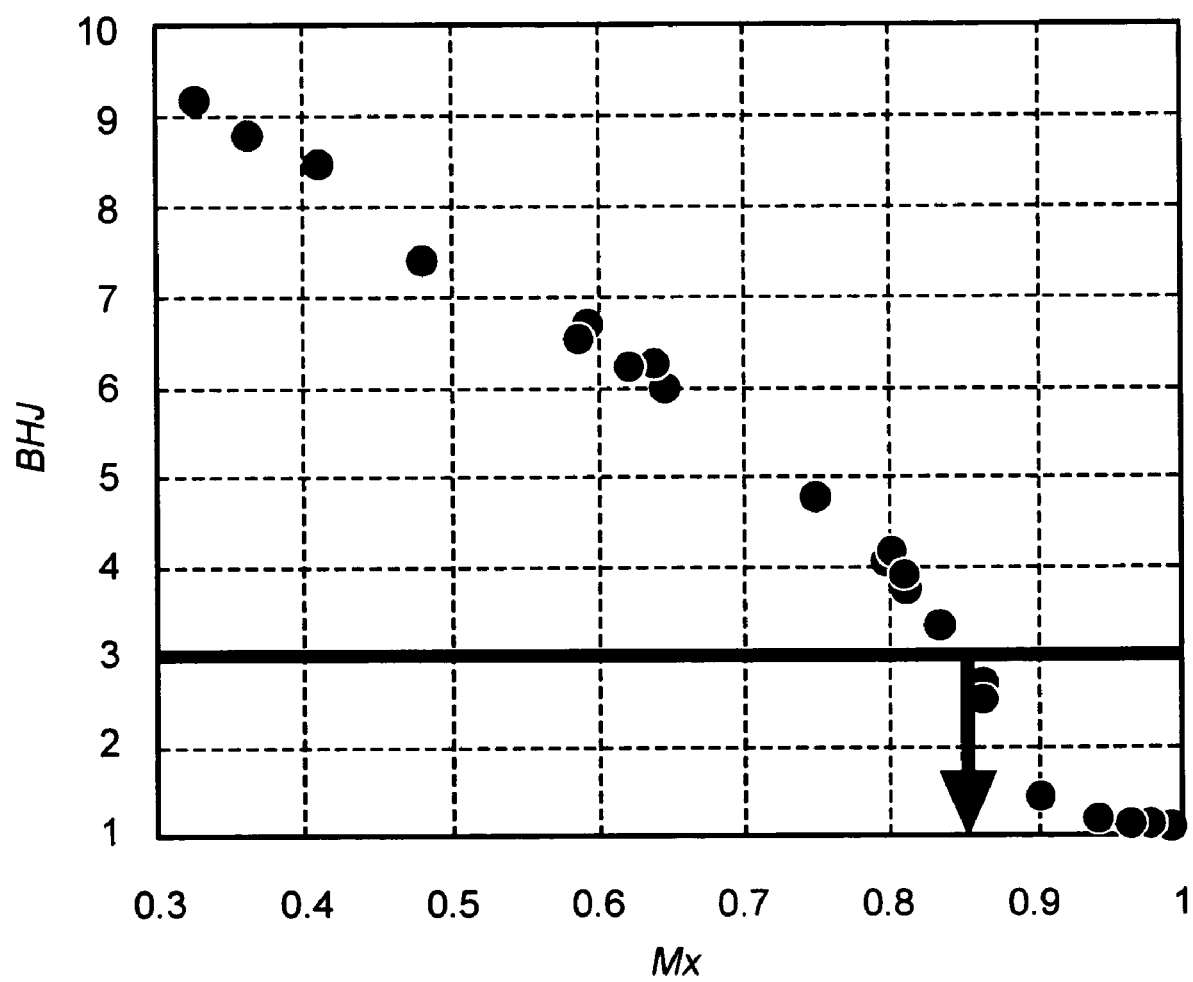
FIG. 8 is a graph showing a relationship between the Mx value as the stability index of output and the BHJ as the index for the nonlinearity of a transfer curve.

FIG. 8 shows the relation between BHJ and Mx obtained through numerical calculation. To examine the relation between both of them, Br, film thickness t, the overriding amount on the magnetoresistive stack of the magnetic domain control film, and the angle at the end of the device are changed as variants. BHJ is a ratio between the maximum gradient and the average gradient of a transfer curve. The maximum gradient and the average gradient are equal at BHJ=1 which shows that the curve is completely linear. It also shows that the linearity of the curve is poor as BHJ is larger. In view of the above, it can be seen that the trend of both of them lies on one curve irrespective of the shape of the magnetic domain control film, in which the value of BHJ decreases as Mx gets larger and the linearity of the transfer curve is improved.

A read head having a transfer curve of a good linearity does not generate waveform fluctuation caused by nonlinearity of the transfer curve. On the other hand, when Mx is smaller, BHJ is larger to generate waveform fluctuation caused by the nonlinearity of the transfer curve. It has been experimentally confirmed that the transfer curve can be substantially regarded as linear at BHJ≦3.0. Accordingly, FIG. 8 shows that when a magnetic domain control magnetic field is applied to increase Mx to 0.85 or more, the transfer curve becomes linear to prevent jump or hysteresis and can provide a stable output waveform. As described above, the stability of the output can be judged based on the magnitude of the value of Mx calculated under a certain magnetic domain control condition.

Figure 9:
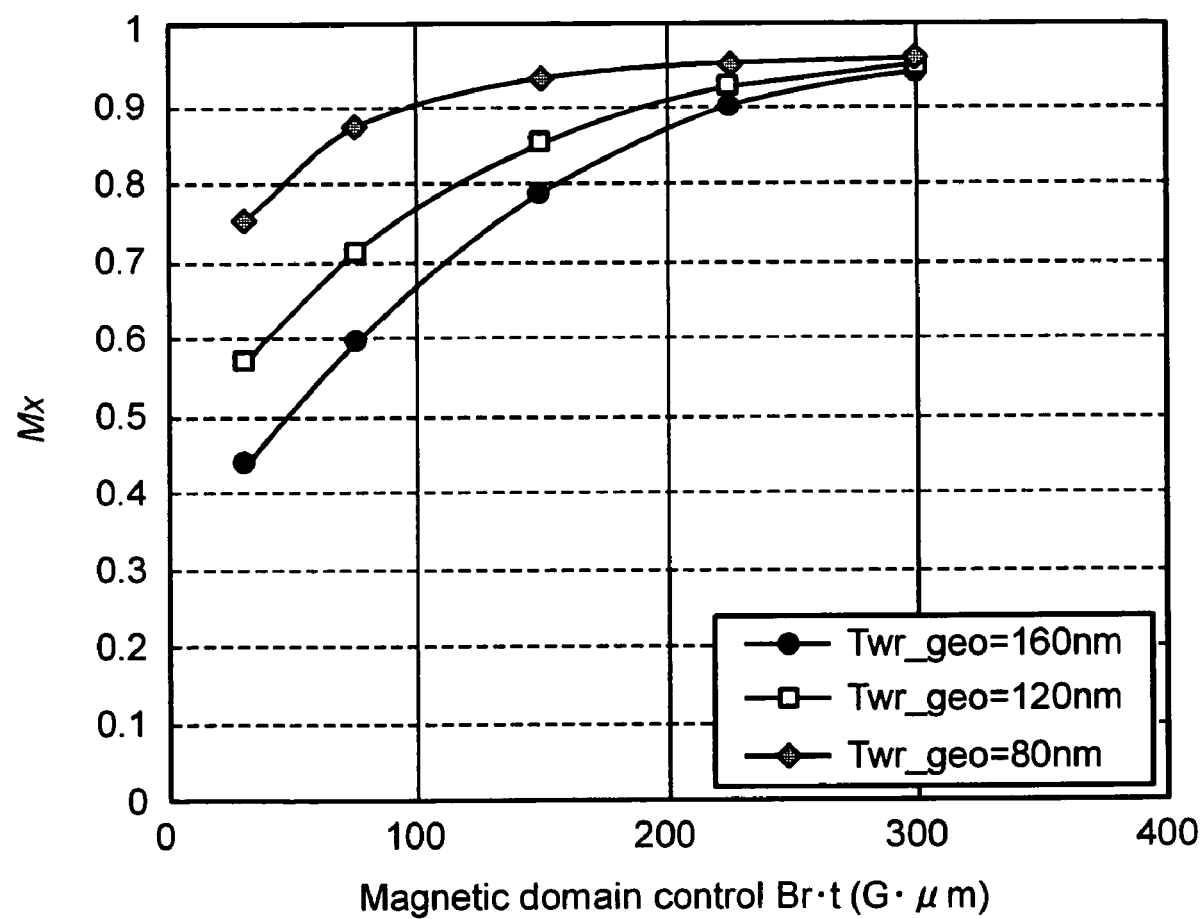
FIG. 9 is a graph showing an example of change of the Mx value when the magnetization film thickness product of the magnetic domain control film is changed.
Figure 10:
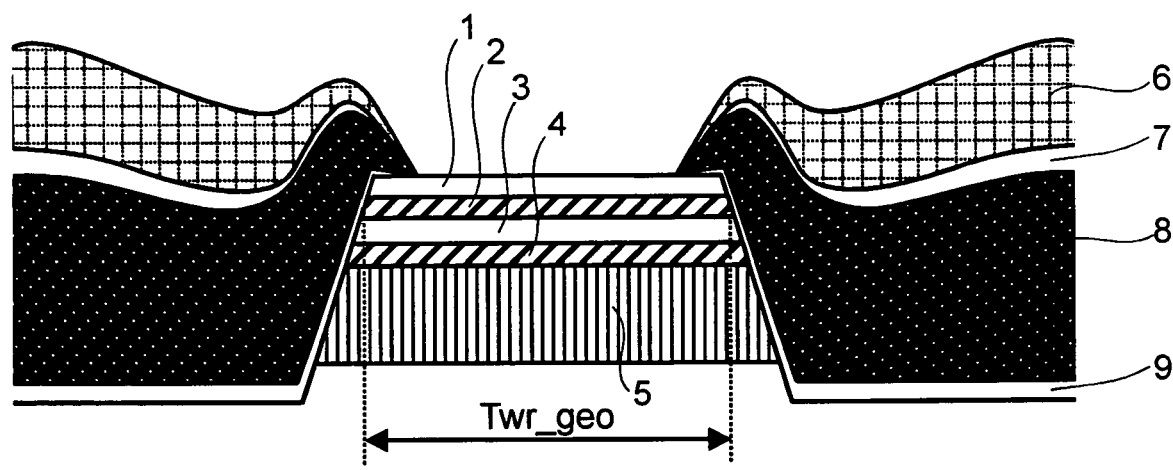
FIG. 10 is a view showing an existent magnetic domain control system using magnetic films.
Figure 11:
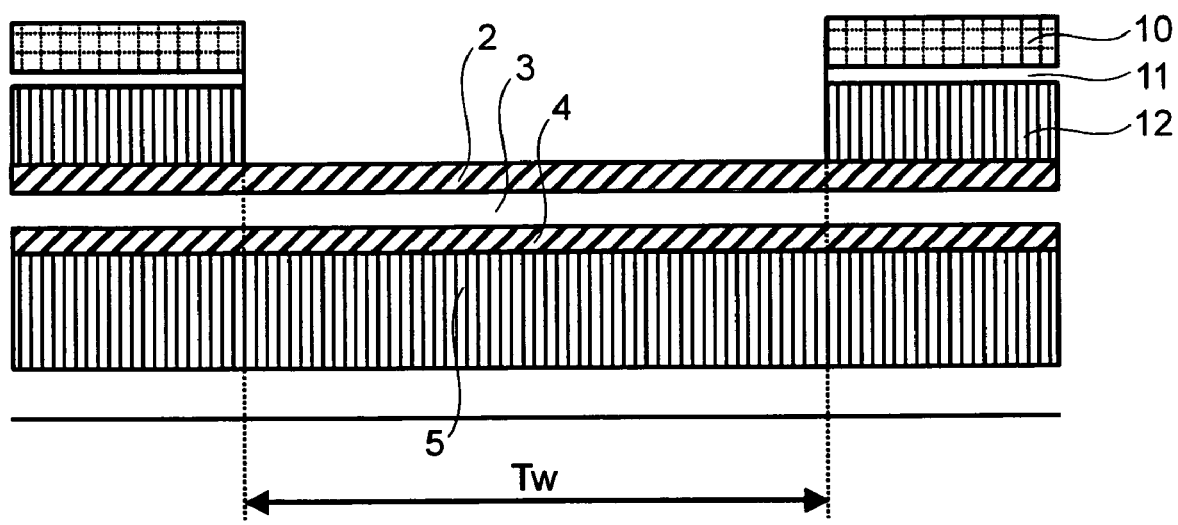
FIG. 11 is a view showing an existent magnetic domain control system using antiferromagnetic films.

FIG. 9 shows a result of a change in the value of Mx when the value of the magnetization film thickness product Br·t of the magnetic domain control film is changed for the geometrical track widths Twr_geo=160 nm, 120 nm, and 180 nm. In this case, the aspect ratio $h_{MR}$/Twr_geo defined by the ratio between geometrical track width Twr_geo and the device height $h_{MR}$ is fixed; the read gap length is 65 nm; the free layer thickness is 3.2 nm; the pinned layer thickness is 4.0 nm; and the saturated magnetic flux densities are 13125 G and 4000 G. The magnetic domain control film is approximated to a polygonal shape as viewed from the air-bearing surface, and the magnetic field generated by the magnetic pole on each side at the position of the free layer is calculated while taking the effect of a shield into consideration. The overriding amount of the magnetic domain control film on the magnetoresistive stack is fixed to as extremely small as 12 nm, and the angle at the end of the stack is fixed.

For any of the geometrical track widths, Mx decreases as Br·t decreases, to worsen the linearity of transfer curves, in which the change is more moderate as the geometrical track width narrows. Calculations performed at various geometrical track widths and values for Br·t to yield Mx at a threshold value of 0.85 were plotted on the ordinate as blank circles in FIG. 1. As the geometrical track width decreases, the value of the magnetization film thickness product Br·t required to give Mx the threshold value of 0.85 decreases linearly from 240 nm to 160 nm. This is probably attributable to the fact that the magnetically sensitive portion of the free layer decreases as the geometrical track width becomes smaller, so that magnetization of the free layer easily tends to rotate uniformly.

However, when the geometrical track width decreases more than 160 nm, the required magnetization film thickness product decreases more abruptly than usual. That is, the magnetic domain can be controlled with a smaller magnetic field than considered so far. This is probably attributable to the fact that the magnetic domain control field has been applied only to a portion in the vicinity of the end of the free layer and is now applied over the entire free layer as the geometrical track width is narrowed. It is probable that since the magnetic domain control field is applied over the entire area of the free layer, Mx reaches the threshold value 0.85 by a magnetic field lower than usual at the end of the free layer and, as a result, a magnetic domain can be controlled with a smaller magnetization film thickness product.

Such change, different from the usual case, is observed when the geometrical track width is smaller than 160 nm.

The change of the magnetization film thickness product required to satisfy the threshold value of Mx when Twr_geo is smaller than 160 nm is approximated with a function. Consequently, an equation is obtained as follows:

$$Br\cdot t = -2.94\cdot 10^{-4} x^3 + 8.54\cdot 10^{-2} x^2 - 5.73x + 116.$$

The magnetization film thickness product Br·t of the magnetic domain control film is expressed in G·μm and the geometrical track width Twr_geo is expressed as x in nm. Clearly, if the film thickness product Br·t or the geometrical track width Twr_geo were expressed in other units, the coefficients of the equation would change accordingly.

The existent change is that of a monotonic decrease relative to the decrease of the geometrical track, that is, $Br\cdot t = 3.75\cdot 10^{-1} x + 130$. Accordingly, a region designated in FIG. 1, namely, $-2.94\cdot 10^{-4} x^3 + 8.54\cdot 10^{-2} x^2 - 5.73x + 116 \leq Br\cdot t < 3.75\cdot 10^{-1} x + 130$, is a region where the output is stabilized and the region provides an output higher than that of the usual conditions. In this case, the defined area is represented by the inequality, $40 \leq x < 160$, and the minimum value in the defined region is a value considering the track width forming process.

Accordingly, in the magnetoresistive head of the structure described above, if the geometrical track width and the magnetization film thickness of the magnetic domain control film are included in the range described above, a magnetoresistive head can be attained which provides no hysteresis in the transfer curve, stable output and good sensitivity.

Embodiment 2

A magnetoresistive head according to Embodiment 2 of the present invention is identical with that shown in FIG. 3 for Embodiment 1. Further, it may be of a structure not only as shown in FIG. 3 where the magnetic domain control film consists of a single layer but also as shown in FIG. 5, explained for Embodiment 1, where a magnetic domain is controlled by a magnetic domain control stack L1.

Figure 14:
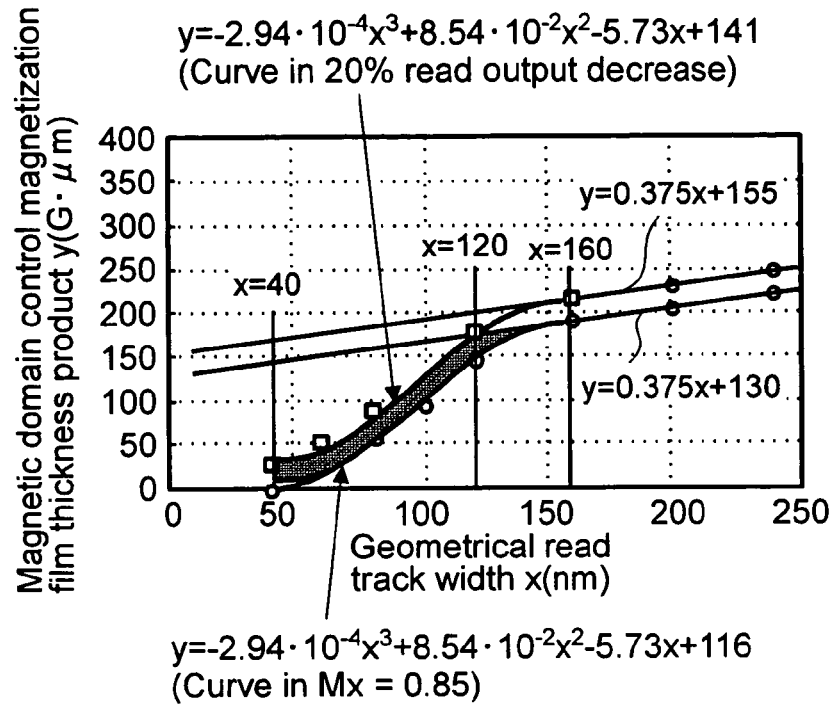
FIG. 14 is a graph showing a range for a geometrical track width Twr_geo and a magnetization film thickness product which satisfies the output stabilizing condition of Mx≧0.85 and a condition of 20% decrease range in second and sixth embodiments of the invention.

FIG. 8 shows that when a magnetic domain control field that yields Mx 0.85 or more is applied, the transfer curve becomes linear; neither jump nor hysteresis is generated and a stable output waveform can be obtained. FIG. 14 is a graph in which, using the threshold value, the required magnetization film thickness product relative to the geometrical track width is plotted. The required magnetization film thickness product Br·t shows a substantially linear change in a case where the geometrical track width is larger than 160 nm and it rapidly decreases in a case where it is smaller than 160 nm. When the change of the required magnetization film thickness product to satisfy the threshold value for Mx in a case where Twr_geo is smaller than 160 nm is approximated with a function, $Br\cdot t = -2.94\cdot 10^{-4} x^3 + 8.54\cdot 10^{-2} x^2 - 5.73x + 116$ (○ plotted curve). The magnetization film thickness product Br·t of the magnetic domain control film is expressed in G·μm and the geometrical track width Twr_geo is expressed as x in nm.

The existent change is that of a monotonic decrease relative to the decrease of the geometrical track, that is, $Br\cdot t = 3.75\cdot 10^{-1} x + 130$. In this embodiment, the read output is at the maximum of Br·t for Mx=0.85 among the threshold values for Mx (stable region from 0.85 to 1.0). Further, when Br·t is excessively increased, the read output decreases enough to result in a problem. Twenty percent output decrease in view of the output value of the Br·t curve corresponding to the lower threshold value 0.85 for Mx (○ plotted curve) is permissible.

The required magnetization film thickness product at a 20% output decrease is shown by square plots in FIG. 14 (□ plotted curve). In view of the above, the region designated in FIG. 14, namely, $-2.94\cdot 10^{-4} x^3 + 8.54\cdot 10^{-2} x^2 - 5.73x + 116 \leq Br\cdot t \leq -2.94\cdot 10^{-4} x^3 + 8.54\cdot 10^{-2} x^2 - 5.73x + 141$, and $Br\cdot t < 3.75\cdot 10^{-1} x + 130$ is a region where the output is stabilized and output is higher than that of usual conditions. In this case, the defined region is represented by an inequality, $40 \leq x < 160$, and the minimum value in the defined region is a value taking the track width forming process into consideration.

Accordingly, in the magnetoresistive head of the structure described above, if the geometrical track width and the magnetization film thickness of the magnetic domain control film are included in the range described above, a magnetoresistive head can be attained which provides no hysteresis in the transfer curve, stable output and good sensitivity. Further, a magnetoresistive head also can be attained which provides a read output higher than that of the devices of existent designs.

Further, within the range of $x \leq 120$, if the value for Br·t is within the region between "○ plotted curve" and "□ plotted curve", stable output with no hysteresis in the transfer curve can be attained and high read output can be obtained in a range completely different from the existent designed range of magnetic domain control film thickness.

Embodiment 3

FIG. 3 shows a magnetoresistive device according to Embodiment 1 of the present invention as viewed from an air-bearing surface. A free layer 2 is disposed by means of a nonmagnetic layer 3 above a soft magnetic film 4 (referred to as a pinned layer) in which the magnetization is fixed by an antiferromagnetic film 5, and a cap layer 1 is provided on free layer 2 to prevent it from oxidation. The width of free layer 2 is referred to as a geometrical track width Twr_geo. Both ends of a magnetoresistive stack comprising layers 1 to 5 are etched by milling or the like and the device has a trapezoidal shape as viewed from the air-bearing surface as shown in FIG. 3. Magnetic domain control films 8 each comprising a magnetic film are disposed on both ends of the device by way of underlying films 9.

It is preferred that the magnetic domain control film has a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. The elements and the ratio thereof can be determined by an energy-dispersion-type X-ray analyzer (EDX), based on which a Br value can be estimated. The thickness of the magnetic domain control film has a distribution depending on the resist shape or a film deposition apparatus such as IBD. In addition, the film is shaped so that the thickness is uniform in a portion remote from the device but decreased in the vicinity of the device and so that it rides over the upper portion of the magnetoresistive stack. The thickness t of the magnetic domain control film is defined herein as a film thickness for a uniform portion which is remote enough from the device. The film thickness can be confirmed by a scanning electron microscope (SEM) or transmission electron microscope (TEM).

The magnetic domain control film may not only be a single layer structure as shown in FIG. 3 but may also be a structure as shown in FIG. 5 that controls a magnetic domain by a magnetic control domain stack L1 comprising two or three layers of magnetic films antiferromagnetically coupled by way of nonmagnetic films. In FIG. 5, while the device has a trapezoidal shape like that in FIG. 3, magnetic films 16 are disposed by means of underlying layers 17 on both ends thereof, above which magnetic films 14 are disposed by means of nonmagnetic films 15. Nonmagnetic films 19 are stacked on the magnetic films 14, on which magnetic films 18 are further stacked. Antiferromagnetic films 13 are disposed above the magnetic films 18 in order to fix the magnetizing direction of magnetic films 18 in one direction. However, use of antiferromagnetic film 13 may be saved by considering the conditions for magnetization, etc. Electrode layers 6 are disposed above them by means of underlying layers 7. Underlying layer 7 may be saved. Magnetic domain control for the free layer is conducted by the magnetic domain control stack L1 comprising layers 13 to 19.

Each magnetic film 14, magnetic film 16 and magnetic film 18 is a magnetic film having a soft magnetic property containing Fe or Ni, or is a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. Each nonmagnetic film 15 and nonmagnetic film 19 is characterized by comprising Ru, Cr, Ir, Rh, Os, Re, Au, Ag, Cu, or an alloy thereof. Magnetic film 16 and magnetic film 14 are antiferromagnetically coupled by means of nonmagnetic film 15. Magnetic film 14 and magnetic film 18 are antiferromagnetically coupled by way of nonmagnetic films 19. Magnetic film 18 may be magnetized in the direction identical with the direction along which a final magnetic domain control field is applied or magnetization may be aligned in direction by antiferromagnetic film 13. Thus, magnetic film 14 is coupled in a counter-parallel manner and, further, the magnetic film 16 closest to the magnetoresistive stack is coupled in a counter-parallel manner to control the magnetic domain, thereby enabling magnetic domain control for the free layer.

When using the magnetic domain control film stack L1, the magnetization film thickness product is defined by means of a magnetization film thickness product of each of the magnetic films constituting the stack. A sum is taken when the two magnetic films are coupled in parallel, whereas a difference is taken when they are in counter-parallel. For example, in FIG. 5, assuming that the residual magnetic flux density of the three layers of magnetic films constituting L1 are Br1, Br2 and Br3, respectively, and those film thicknesses are t1, t2, and t3, respectively, and that magnetization is directed as shown by arrows in the drawing, $Br \cdot t = Br1 \cdot t1 - Br2 \cdot t2 + Br3 \cdot t3$. In this case, it is also assumed that t or t1, t2, t3 is a thickness for a portion that is remote enough from the device and where the thickness is constant.

FIG. 8 shows that when a magnetic domain control field that yields Mx 0.85 or more is applied, the transfer curve becomes linear, thereby causing neither jump nor hysteresis, and a stable output waveform can be obtained. However, the threshold value is a limit value to keep the transfer curve linear. Taking the variations of product properties, etc. into consideration, more severe conditions are desirable. In view of FIG. 8, it can be seen that BHJ, representing the nonlinearity of the transfer curve is approximately 1 when Mx is 0.90 or more, in which the transfer curve further approaches linearity. Accordingly, a more severe condition is obtained when the threshold value is 0.90.

Figure 2:
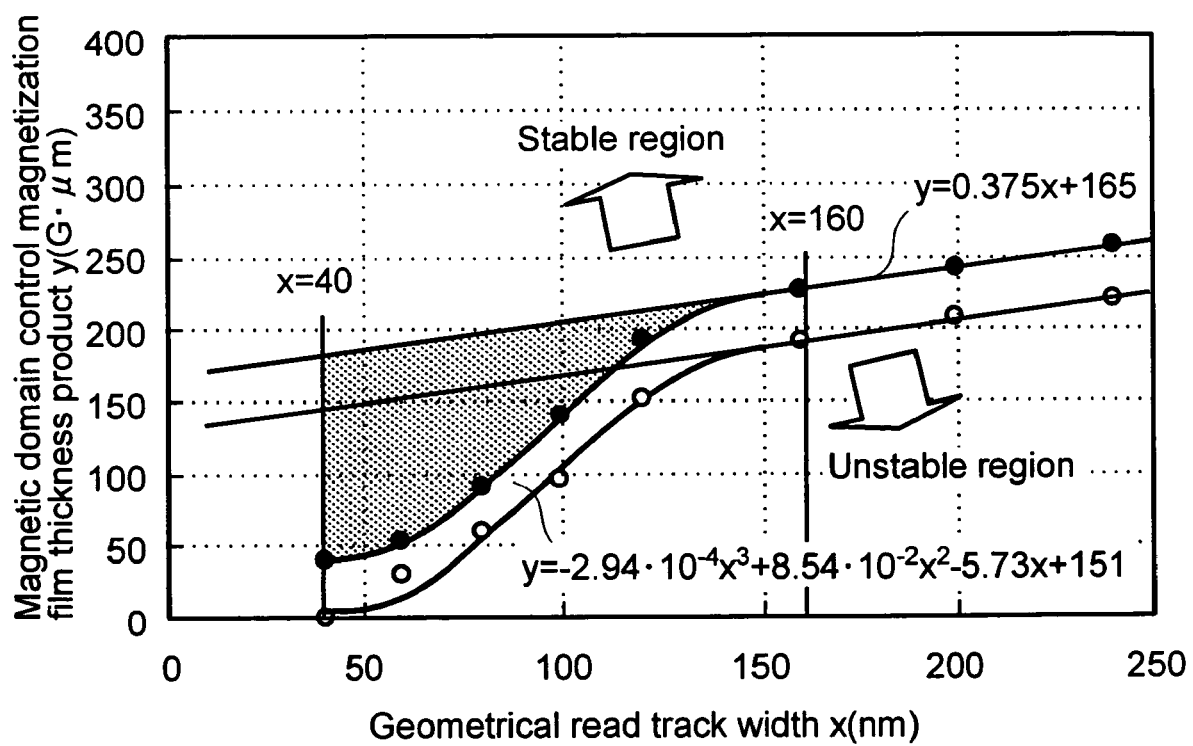
FIG. 2 is a graph showing a range for the geometrical track width Twr_geo and the magnetization film thickness product, which satisfies the output stabilizing condition of Mx≧0.90 in the third and seventh embodiments of the invention.

The requisite magnetization film thickness product relative to the geometrical track width in a case using the threshold value is plotted as solid circles in FIG. 2. In this example, the requisite magnetization film thickness product is larger than that of Mx 0.85 or more. Irrespective of the magnitude of the threshold value, the trend is similar and the requisite magnetization film thickness product Br·t shows a substantially linear change when the geometrical track width is 160 nm or more and decreases abruptly when it is smaller than 160 nm.

When the change of the magnetization film thickness product required to satisfy the threshold value of Mx when Twr_geo is smaller than 160 nm is approximated with a function, $Br \cdot t = -2.94 \cdot 10^{-4} x^3 + 8.54 \cdot 10^{-2} x^2 - 5.73x + 151$. The magnetization film thickness product Br·t of the magnetic domain control film is expressed in G·μm and the geometrical track width Twr_geo is expressed as x in nm. The existent change is that of a monotonic decrease relative to the decrease of the geometrical track, that is, $Br \cdot t = 3.75 \cdot 10^{-1} x + 165$.

Figure 1:
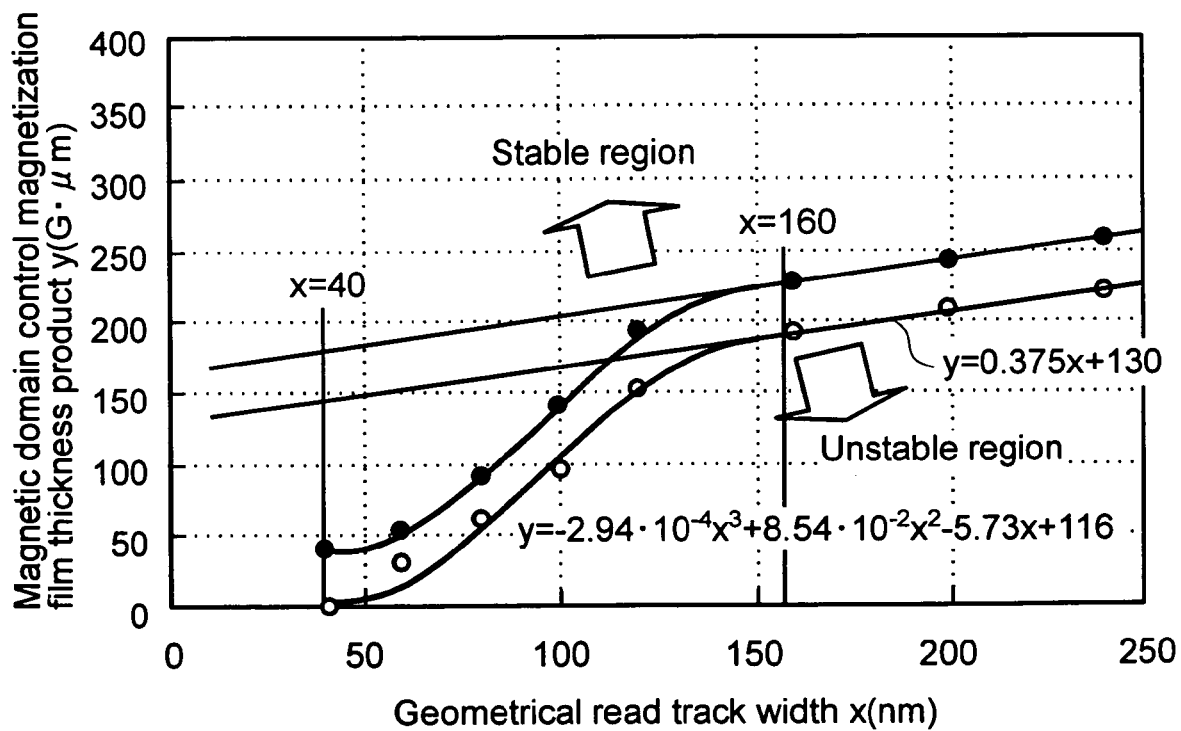
FIG. 1 is a graph showing a range for the geometrical track width Twr_geo and the magnetization film thickness product, which satisfies the output stabilizing condition of Mx≧0.85 in the first and fifth embodiments of the present invention.

Accordingly, a region designated in FIG. 1, namely, $-2.94 \cdot 10^{-4} x^3 + 8.54 \cdot 10^{-2} x^2 - 5.73x + 116 \leq Br \cdot t < 3.75 \cdot 10^{-1} x + 165$, is a region where the output is stabilized and the region provides an output higher than that of the usual conditions. In this case, the defined area is represented by the inequality, $40 \leq x < 160$, and the minimum value in the defined region is a value that takes into consideration the track width forming process.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides stable output and good sensitivity.

Embodiment 4

A magnetoresistive head according to Embodiment 4 of the present invention is identical with that shown in FIG. 3 for Embodiment 3. Further, it may be of a structure not only as shown in FIG. 3, where the magnetic domain control film consists of a single layer, but may also be arranged as shown in FIG. 5, as explained for Embodiment 3, where a magnetic domain is controlled by a magnetic domain control stack L1.

FIG. 8 shows that a transfer curve becomes linear when a magnetic domain control field that yields Mx 0.85 or more is applied. Neither jump nor hysteresis is generated and a stable output waveform can be obtained. However, the threshold value is a limit value to keep the transfer curve linear. Taking the variations of product properties, etc. into consideration, more severe conditions are desirable. In view of FIG. 8, it can be seen that BHJ representing the nonlinearity of the transfer curve is approximately 1 when Mx is 0.90 or more, in which the transfer curve further approaches linearity. Accordingly, a more severe condition is obtained when the threshold value is 0.90.

Figure 15:
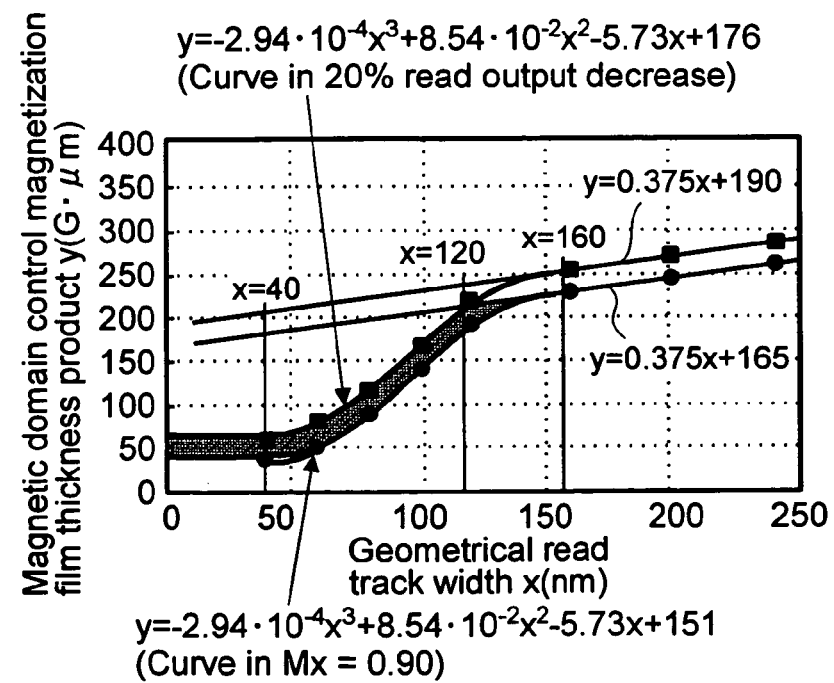
FIG. 15 is a graph showing a range for a geometrical track width Twr_geo and a magnetization film thickness product which satisfies the output stabilizing condition of Mx≧0.90 and condition of 20% decrease range in fourth and eighth embodiments of the invention.

FIG. 15 is a graph on which the requisite magnetization film thickness product relative to the geometrical track width is plotted in a case where the threshold value is used. The requisite magnetization film thickness product Br·t shows substantial linear change when the geometrical track width is larger than 160 nm and it rapidly decreases when the geometrical track width is smaller than 160 nm. When the change of the magnetization film thickness product required to satisfy the threshold value for Mx in a case where Twr_geo is smaller than 160 nm is approximated with a function, $Br \cdot t = -2.94 \cdot 10^{-4} x^3 + 8.54 \cdot 10^{-2} x^2 - 5.73x + 151$ (● plotted curve). The magnetization film thickness product Br·t of the magnetic domain control film is expressed in G·μm and the geometrical track width Twr_geo is expressed as x in nm.

The existent change is that of a monotonic decrease relative to the decrease of the geometrical track, namely, Br·t=3.75·10⁻¹x+190. In this embodiment, the read output is at the maximum of Br·t for Mx=0.90 among the threshold values for Mx (stable region from 0.90 to 1.0). Further, when Br·t is excessively increased, the read output decreases enough to result in a problem. Twenty percent output decrease in view of the output value of the Br·t curve corresponding to the lower threshold value 0.85 for Mx (● plotted curve) is permissible. The requisite magnetization film thickness product at a 20% output decrease is shown by square plots in FIG. 15 (■ plotted curve). In view of the above, the region designated in FIG. 15, namely, $-2.94 \cdot 10^{-4} x^3 + 8.54 \cdot 10^{-2} x^2 - 5.73x + 151 \leq Br \cdot t \leq -2.94 \cdot 10^{-4} x^3 + 8.54 \cdot 10^{-2} x^2 - 5.73x + 176$, and $Br \cdot t < 3.75 \cdot 10^{-1} x + 165$ is a region where the output is stabilized and output is higher than that under the usual conditions. In this case, the defined region is represented by an inequality $40 \leq x < 160$ and the minimum value in the defined region is a value taking the track width forming process into consideration.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides extremely stable output and good sensitivity. Further, a magnetoresistive head also can be attained which provides a read output higher than that of the existent designs.

Further, within the range of $x \leq 120$, if the value for Br·t is within the region between "● plotted curve" and "■ plotted curve", stable output with no hysteresis in the transfer curve can be attained and high read output can be obtained in a range completely different from the existent designed range of the magnetic domain control film thickness.

Embodiment 5

Figure 4:
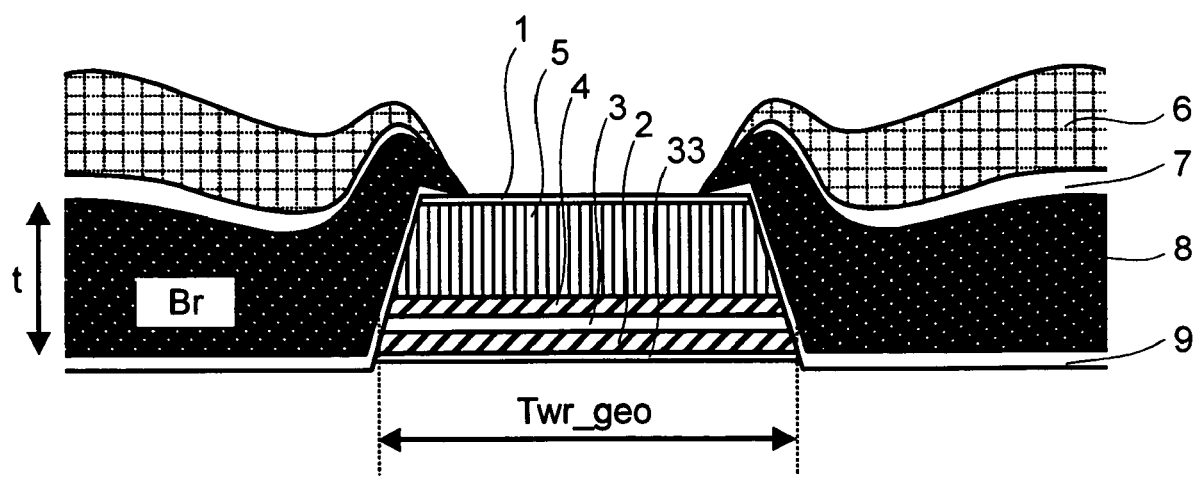
FIG. 4 shows a structure of a top type magnetoresistive device, in which an antiferromagnetic film is situated above the free layer in the fifth to eighth embodiments of the invention, as viewed from an air-bearing surface.

FIG. 4 is a view of a magnetoresistive device (top-spin bulb-type head), as viewed from an air-bearing surface. A soft magnetic film 4 (referred to as a pinned layer) whose magnetization is fixed by an antiferromagnetic film 5 by means of a nonmagnetic layer 3 is disposed above a free layer 2. A cap film 1 is disposed on the antiferromagnetic film 5. The width of free layer 2 is referred to as a geometrical track width Twr_geo. Both ends of a magnetoresistive stack comprising layers 1 to 5 are etched by milling or the like, and the device has a trapezoidal shape as viewed from an air-bearing surface as shown in FIG. 4. Magnetic domain control films 8 each comprising a magnetic film are disposed on both ends of the device by means of underlying films 9.

It is preferred that the magnetic domain control film has a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. The elements and the ratio thereof can be determined by an energy-dispersion-type X-ray analyzer (EDX), based on which Br value can be estimated. The thickness of the magnetic domain control film has a distribution depending on the resist shape or a film deposition apparatus such as IBD, and the film has is shaped so that the thickness is uniform at a portion remote from the device but decreased at a portion in the vicinity of the device and so that it rides over the upper portion of the magnetoresistive stack. The thickness t of the magnetic domain control film is determined herein as a film thickness of a uniform portion which is remote enough from the device. The film thickness can be confirmed by a scanning electron microscope (SEM) or transmission electron microscope (TEM).

Figure 6:
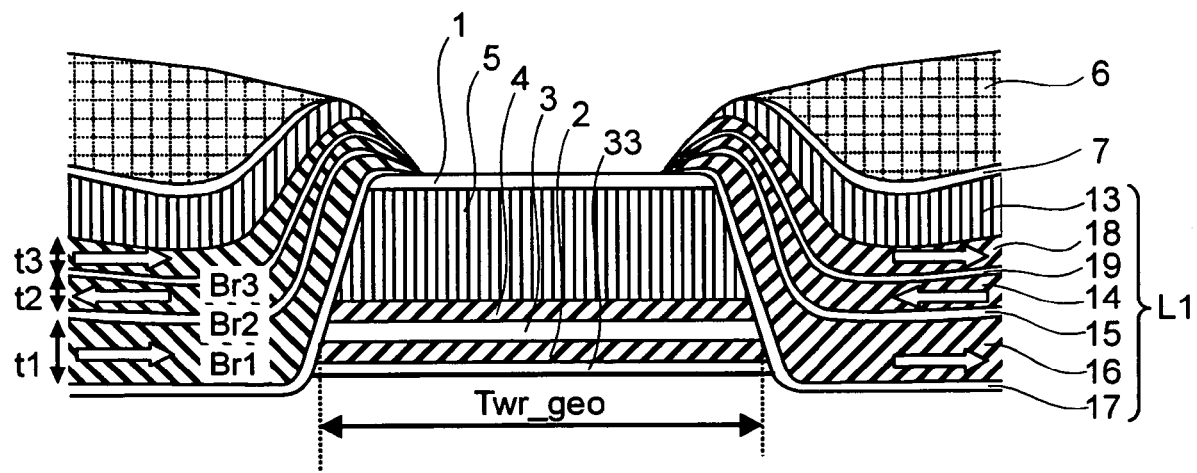
FIG. 6 shows a structure of a top magnetoresistive device, in which an antiferromagnetic film is situated above the free layer and a magnetic domain control film comprising stacked films, in other fifth to eighth embodiments of the invention as viewed from an air-bearing surface.

The magnetic domain control film may be not only a single layer structure as shown in FIG. 4 but may also be a structure as shown in FIG. 6 that controls a magnetic domain by a magnetic control domain stack L1 comprising two or three layers of magnetic films antiferromagnetically coupled by way of nonmagnetic films. In FIG. 6, while the device has a trapezoidal shape like that in FIG. 4, magnetic films 16 are disposed by way of underlying layers 17 on both ends thereof, above which magnetic films 14 are disposed by means of nonmagnetic films 15. Nonmagnetic films 19 are stacked on magnetic films 14, on which magnetic films 18 are further stacked. Antiferromagnetic films 13 are disposed on magnetic films 18 in order to fix the magnetizing direction of magnetic films 18 in one direction. However, use of antiferromagnetic film 13 may be saved by considering the conditions for magnetization, etc. Electrode layers 6 are disposed above them by means of underlying layers 7. Underlying layers 7 may be saved. Magnetic domain control for the free layer is performed by the magnetic domain control stack L1 comprising t layers 13 to 19.

Each of magnetic film 14, magnetic film 16 and the magnetic film 18 is a magnetic film having soft magnetic property containing Fe or Ni, or a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. Each of nonmagnetic film 15 and nonmagnetic film 19 is characterized by comprising Ru, Cr, Ir, Rh, Os, Re, Au, Ag, Cu, or an alloy thereof. Magnetic film 16 and magnetic film 14 are antiferromagnetically coupled by means of nonmagnetic film 15. In addition, magnetic film 14 and magnetic film 18 are antiferromagnetically coupled by means of nonmagnetic film 15. When magnetic film 18 is magnetized in the direction identical with the direction along which a final magnetic domain control field is applied or magnetization is aligned in direction by antiferromagnetic film 13, magnetic film 14 is coupled in a counter-parallel manner and, further, magnetic film 16 closest to the magnetoresistive stack is coupled in a counter-parallel manner, to control the magnetic domain, thereby enabling magnetic domain control for the free layer.

When using the magnetic domain control film stack L1, the magnetization film thickness product is defined using a magnetization film thickness product of each of the magnetic films constituting the stack. A sum is taken when the two magnetic films are coupled in parallel, whereas a difference is taken where they are in counter-parallel. For example, in FIG. 6, assuming that the residual magnetic flux density of the three layers of magnetic films constituting L1 are Br1, Br2 and Br3, respectively, and film thicknesses are t1, t2, and t3, respectively, and that magnetization is directed as shown by the arrows in the figure, Br·t=Br1·t1−Br2·t2+Br3·t3. In this case, t or t1, t2, or t3 is also a thickness of a portion that is remote enough from the device and where the thickness is constant.

FIG. 8 shows that when a magnetic domain control magnetic field that yields Mx 0.85 or more is applied, the transfer curve becomes linear, causing neither jump nor hysteresis, and a stable output waveform can be provided. In a graph using this threshold value, the requisite magnetization film thickness product relative to the geometrical track width can be expressed by the blank circles in FIG. 1 in the same manner as Embodiment 1.

When the magnetization film thickness product Br·t of the magnetic domain control film is expressed in G·μm and the geometrical track width Twr_geo is expressed as x in nm, a region designated in FIG. 1, namely, $-2.94 \cdot 10^{-4} x^3 + 8.54 \cdot 10^{-2} x^2 - 5.73x + 116 \leq Br \cdot t < 3.75 \cdot 10^{-1} x + 130$, is a region where the output is stabilized and output is higher than that under the usual conditions. In this case, the defined area is represented by the inequality, namely, $40 \leq x < 160$, and the minimum value in the defined region is a value that takes the track width forming process into consideration.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides stable output and good sensitivity.

Embodiment 6

A magnetoresistive device (top-spin bulb-type head) according to Embodiment 6 of the present invention is identical with that shown in FIG. 4 for Embodiment 5. Further, it may be of a structure not only as shown in FIG. 4 where the magnetic domain control film consists of a single layer but may also be as shown in FIG. 6 as explained for Embodiment 5, where a magnetic domain is controlled by magnetic domain control stack L1.

FIG. 8 shows that a transfer curve becomes linear when a magnetic domain control field that yields Mx 0.85 or more is applied, neither jump nor hysteresis is generated and a stable output waveform can be obtained. FIG. 14 is a graph in which requisite magnetization film thickness product relative to the geometrical track width is plotted when using the threshold value, which is identical with Embodiment 5. The requisite magnetization film thickness product Br·t shows a substantially linear change when the geometrical track width is larger than 160 nm and a rapid decrease when it is smaller than 160 nm. When the change of the requisite magnetization film thickness product to satisfy the threshold value for Mx in a case where Twr_geo is smaller than 160 nm is approximated with a function, $Br \cdot t = -2.94 \cdot 10^{-4} x^3 + 8.54 \cdot 10^{-2} x^2 - 5.73x + 116$ (○ plotted curve). The magnetization film thickness product Br·t of the magnetic domain control film is expressed in G·μm and the geometrical track width Twr_geo is expressed as x in nm. The existent change is that of a monotonic decrease relative to the decrease of the geometrical track, that is, $Br \cdot t = 3.75 \cdot 10^{-1} x + 130$.

In this embodiment, the read output is at the maximum in the case of Br·t for Mx=0.85 among the threshold values for Mx (a stable region from 0.85 to 1.0). Further, when Br·t is excessively increased, the read output decreases enough to result in a problem. Twenty percent output decrease in view of the output value of the Br·t curve corresponding to the lower threshold value 0.85 for Mx (○ plotted curve) is permissible. The requisite magnetization film thickness product at 20% output decrease is shown by square plots in FIG. 14 (curve of □ plot). In view of the above, the region designated in FIG. 14, that is, $-2.94 \cdot 10^{-4} x^3 + 8.54 \cdot 10^{-2} x^2 - 5.73x + 116 \leq Br \cdot t \leq -2.94 \cdot 10^{-4} x^3 + 8.54 \cdot 10^{-2} x^2 - 5.73x + 141$, and $Br \cdot t < 3.75 \cdot 10^{-1} x + 130$ is a region where the output is stabilized and output is higher than that under the usual conditions. In this case, the defined region is represented by the inequality, $40 \leq x < 160$, and the minimum value in the defined region is a value taking the track width forming process into consideration.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides stable output and good sensitivity. In addition, a magnetoresistive head can be attained that also has a higher read output than those of the existent design.

Further, within the range of $x \leq 120$, when the value of the Br·t is within the region between "○ plotted curve" and "□ plotted curve", stable output with no hysteresis in the transfer curve can be attained and high read output can be obtained in a range completely different from the existent designed range of the magnetic domain control film thickness.

Embodiment 7

FIG. 4 is a view of a magnetoresistive device (top-spin bulb-type head), as viewed from an air-bearing surface. A soft magnetic film 4 (referred to as a pinned layer) whose magnetization is fixed by an antiferromagnetic film 5 by means of a nonmagnetic layer 3 is disposed above a free layer 2. A cap film 1 is disposed on the antiferromagnetic film 5. The width of free layer 2 is referred to as a geometrical track width Twr_geo. Both ends of a magnetoresistive stack comprising layers 1 to 5 are etched by milling or the like, and the device has a trapezoidal shape as viewed from the air-bearing surface as shown in FIG. 4. Magnetic domain control films 8 each comprising a magnetic film are disposed on both ends of the device by means of underlying films 9.

It is preferred that the magnetic domain control film has a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. The elements and the ratio thereof can be determined by an energy-dispersion-type X-ray analyzer (EDX), based on which Br value can be estimated. The thickness of the magnetic domain control film has a distribution depending on the resist shape or a film deposition apparatus such as IBD, and the film is shaped so that the thickness is uniform at a portion remote from the device but decreased at a portion in the vicinity of the device and so that it rides over the upper portion of the magnetoresistive stack. The thickness t of the magnetic domain control film is determined herein as a film thickness of a uniform portion which is remote enough from the device. The film thickness can be confirmed by a scanning electron microscope (SEM) or transmission electron microscope (TEM).

The magnetic domain control film may be not only a single layer structure as shown in FIG. 4 but also a structure as shown in FIG. 6 that controls a magnetic domain by a magnetic control domain stack L1 comprising two or three layers of magnetic films antiferromagnetically coupled by means of nonmagnetic films. In FIG. 6, while the device has a trapezoidal shape like that in FIG. 4, magnetic films 16 are disposed by means of underlying layers 17 on both ends thereof, above which magnetic films 14 are disposed by means of nonmagnetic films 15. Nonmagnetic films 19 are stacked on the magnetic films 14, on which magnetic films 18 are further stacked. Antiferromagnetic films 13 are disposed on magnetic films 18 in order to fix the magnetizing direction of magnetic films 18 in one direction. However, use of antiferromagnetic film 13 may be saved by considering the conditions for magnetization, etc. Electrode layers 6 are disposed above them by means of underlying layers 7. Underlying layers 7 may be saved. Magnetic domain control for the free layer is performed by the magnetic domain control stack L1 comprising layers 13 to 19.

Each of magnetic film 14, magnetic film 16 and magnetic film 18 is a magnetic film having soft magnetic property containing Fe or Ni, or a magnetic film of a CoPt alloy comprising at least 4 to 30 at % of Pt, or a CoCrPt alloy or CoCrPt—$ZrO_2$ or CoCrPt—$SiO_2$ comprising 2 to 15 at % of Cr. Each of nonmagnetic film 15 and nonmagnetic film 19 is characterized by comprising Ru, Cr, kr, Rh, Os, Re, Au, Ag, Cu, or an alloy thereof. Magnetic film 16 and magnetic film 14 are antiferromagnetically coupled by means of nonmagnetic film 15. In addition, magnetic film 14 and magnetic film 18 are antiferromagnetically coupled by means of nonmagnetic film 15. When magnetic film 18 is magnetized in the direction identical with the direction along which a final magnetic domain control field is applied or magnetization is aligned in direction by antiferromagnetic film 13, magnetic film 14 is coupled in a counter-parallel manner and, further, magnetic film 16 closest to the magnetoresistive stack is coupled in a counter-parallel manner, to control the magnetic domain, thereby enabling magnetic domain control for the free layer.

When using the magnetic domain control film stack L1, the magnetization film thickness product is defined using a magnetization film thickness product of each of the magnetic films constituting the stack. A sum is taken when the two magnetic films are coupled in parallel, whereas a difference is taken where they are in counter-parallel. For example, in FIG. 6, assuming that the residual magnetic flux density of the three layers of magnetic films constituting L1 are Br1, Br2 and Br3, respectively, and film thicknesses are t1, t2, and t3, respectively, and that magnetization is directed as shown by the arrows in the figure, Br·t=Br1·t1−Br2·t2+Br3·t3. In this case, t or t1, t2, or t3 also is a thickness of a portion that is remote enough from the device and where the thickness is constant.

FIG. 8 shows that when a magnetic domain control magnetic field that yields Mx 0.85 or more is applied, the transfer curve becomes linear, causing neither jump nor hysteresis, and a stable output waveform can be provided. However, the threshold value is a limit value to keep the transfer curve linear. Taking the variations of product properties, etc. into consideration, more severe conditions are desirable. In view of FIG. 8, it can be seen that BHJ representing the nonlinearity of the transfer curve is approximately 1 when Mx is 0.90 or more, in which the transfer curve further approaches linearity. Accordingly, a more severe condition is obtained when the threshold value is 0.90.

FIG. 2 is a graph in which the requisite magnetization film thickness product relative to the geometrical track width is plotted by solid circles in a case using the threshold value. In this case, the requisite magnetization film thickness product increases compared to that where Mx is 0.85 or more. The trend is similar irrespective of the threshold value. Requisite magnetization film thickness product Br·t shows a substantially linear change when the geometrical track width is larger than 160 nm and a rapid decrease when it is smaller than 160 nm. When the change of the magnetization film thickness product required to satisfy the threshold value for Mx in a case where Twr_geo is smaller than 160 nm is approximated with a function, Br·t=−2.94·$10^{-4}$x3+8.54·$10^{-2}$ $x^2$−5.73x+151. The magnetization film thickness product Br·t of the magnetic domain control film is expressed in G·μm and the geometrical track width Twr_geo is expressed as x in nm.

The existent change is that of a monotonic decrease relative to the decrease of the geometrical track, that is, Br·t=3.75·$10^{-1}$x+165. Accordingly, the region designated in FIG. 2, namely, −2.94·$10^{-4}$$x^3$+8.54·$10^{-2}$$x^2$−5.73x+151≦Br·t<3.75·$10^{-1}$x+165 is a region where the output is stabilized and output is higher than that under the usual conditions. In this case, the defined region is represented by the inequality, 40≦x<160, and the minimum value in the defined region is a value taking the track width forming process into consideration.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides stable output and good sensitivity.

Embodiment 8

A magnetoresistive device (top-spin-bulb-type head) according to Embodiment 8 of the present invention is identical with that shown in FIG. 4 for Embodiment 7. Further, this device may be a structure not only as shown in FIG. 4, where the magnetic domain control film consists of a single layer, but also as shown in FIG. 6 for Embodiment 7, where the magnetic domain is controlled by a magnetic domain control stack L1.

FIG. 8 shows that a transfer curve becomes linear when a magnetic domain control field that yields Mx 0.85 or more is applied. Neither jump nor hysteresis is generated and a stable output waveform can be obtained. FIG. 15 is a graph in which the requisite magnetization film thickness product relative to the geometrical track width is plotted in a case using the threshold value, which is identical with Embodiment 7. The requisite magnetization film thickness product Br·t shows a substantially linear change in a case where the geometrical track width is larger than 160 nm and a rapid decrease in a case where it is smaller than 160 nm. When the change of the required magnetization film thickness product to satisfy the threshold value for Mx in a case where Twr_geo is smaller than 160 nm is approximated with a function, Br·t=−2.94·$10^{-4}$x3+8.54·$10^{-2}$$x^2$−5.73x+151 (● plotted curve). The magnetization film thickness product Br·t of the magnetic domain control film is expressed in G·μm and the geometrical track width Twr_geo is expressed as x in nm.

The existent change is that of a monotonic decrease relative to the decrease of the geometrical track, that is, Br·t=3.75·$10^{-1}$x+165. In this embodiment, the read output is at the maximum in a case of Br·t for Mx=0.90 among the threshold values for Mx (stable region from 0.90 to 1.0). Further, when Br·t is excessively increased, the read output decreases enough to result in a problem. Twenty percent output decrease in view of the output value of the Br·t curve corresponding to the lower threshold value 0.90 for Mx (● plotted curve) is permissible. The requisite magnetization film thickness product at 20% output decrease is shown by square plots in FIG. 15 (■ plotted curve). In view of the above, the region designated in FIG. 15, that is, −2.94·$10^{-4}$$x^3$+8.54·$10^{-2}$$x^2$−5.73x+151≦Br·t≦−2.94·$10^{-4}$$x^3$+8.54·$10^{-2}$$x^2$−5.73x+176, and Br·t<3.75·$10^{-1}$x+165 is a region where the output is stabilized and output is higher than that under the usual conditions. In this case, the defined region is represented by the inequality, 40≦x<160, and the minimum value in the defined region is a value taking the track width forming process into consideration.

Accordingly, in the magnetoresistive head of the structure described above, if the geometrical track width and the magnetization film thickness of the magnetic domain control film are included in the range described above, a magnetoresistive head can be attained which, having no hysteresis in the transfer curve, provides stable output and good sensitivity. In addition, a magnetoresistive head also having a higher read output than those of the existent design can be attained.

Further, within the range of x≦120, when the value of the Br·t is within the region between "● plotted curve" and "■ plotted curve", stable output with no hysteresis in the transfer curve can be attained and high read output can be obtained in a range completely different from the existent designed range of the magnetic domain control film thickness.

Embodiment 9

FIG. 16 shows a magnetoresistive device according to the present invention as viewed from an air-bearing surface. A free layer 2 is disposed by way of a nonmagnetic layer 3 above a soft magnetic film 4 (referred to as pinned layer) whose magnetization is fixed by an antiferromagnetic film 5, above which a cap layer 1 is disposed in order to prevent oxidation of the free layer. The width of free layer 2 is referred to as a geometrical track width Twr_geo. Both ends of the magnetic resistive stack comprising layers 1 to 5 are etched by milling, or the like, and the device has a trapezoidal shape as viewed from the air-bearing surface as shown in FIG. 16. While the device is shown as a bottom-spin bulb-type head, it may be a top-spin bulb-type head. Electrode layers 6 are disposed by means of electrode underlying layers 7 on both ends of the device.

In view of FIG. 1 or FIG. 14, the device output is stabilized with no magnetic domain control film at a portion in which the geometrical track width is smaller than 40 nm. Accordingly, in a case where the geometrical track width is smaller than 40 nm, the read output can be stabilized also by the structure not using magnetic domain control film, that is, by the construction not having magnetic domain control magnetic film 8, and underlying film 9 for magnetic domain control magnetic film 8 shown in FIGS. 3 and 4. In FIG. 16, electrode underlying film 7 is formed directly on an insulative layer (not illustrated) disposed to the substrate of the head and electrode film 6 is formed on electrode underlying layer film 7.

The magnetoresistive head with the geometrical track width of 40 nm or smaller, having no hysteresis in the transfer curve, can provide stable output and good sensitivity by the structure not forming magnetic domain control magnetic film.

Embodiment 10

FIG. 17 shows a magnetoresistive device according to the present invention as viewed from an air-bearing surface. A free layer 2 is disposed by way of a nonmagnetic layer 3 above a soft magnetic film 4 (referred to as a pinned layer) whose magnetization is fixed by an antiferromagnetic film 5, above which a cap layer 1 is disposed in order to prevent oxidation of the free layer. The width of the free layer is referred to as a geometrical track width Twr_geo. Both ends of the magnetic resistive stack comprising layers 1 to 5 are etched by milling, or the like, and the device has a trapezoidal shape as viewed from the air-bearing surface as shown in FIG. 17. Although the device is shown as a bottom-spin bulb-type head, it may be a top-spin bulb-type head. Electrode layers 6 are disposed by means of electrode underlying layers 7 on both ends of the device. In view of FIG. 2 or FIG. 15, in a case where the geometrical track width is 40 nm or smaller, the device output is stabilized within an extremely small range of the magnetic domain control film (Br·t: 30–60 G·μm). Accordingly, in a case where the geometrical track width is smaller than 40 nm, the read output can be stabilized by the construction shown in FIG. 17 (Br·t for the magnetic domain control magnetic layer is from 30 to 60 G·μm)

A magnetoresistive head with a geometrical track width of 40 nm or smaller, having no hysteresis in the transfer curve, can provide stable output and good sensitivity with a structure that does not form a magnetic domain control magnetic film.

Embodiment 11

Figure 12:
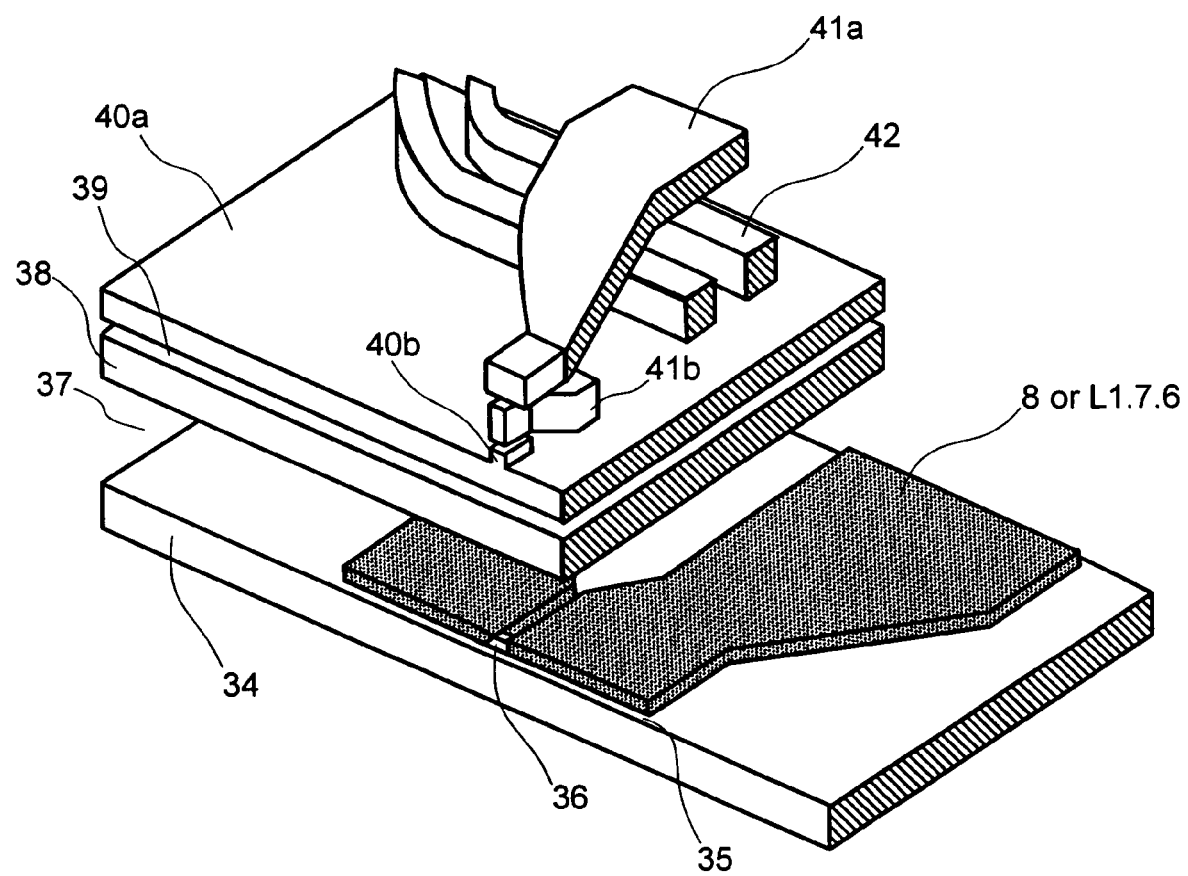
FIG. 12 is a view of an entire magnetic head incorporated with a read head having a magnetic domain control structure of the invention (read head and write head)

FIG. 12 shows a view of an entire magnetic head incorporated with a read head having the magnetic domain control structure described above. A magnetoresistive stack 36 having a magnetoresistive effect is disposed by way of an insulative layer 35 above a lower shield 34, and a magnetic domain control film 8 or a magnetic domain control stack L1 is disposed adjacent to inclined surfaces on both ends thereof, and electrodes 6 are disposed thereon. An upper shield 38 is disposed by way of an insulative layer 37 above electrodes 6. A lower magnetic pole piece 40a is disposed by way of an insulative layer 39 above upper shield 38. A portion of the lower magnetic pole has a protruding structure 40b that performs recording operation. Coils 42 and upper magnetic pole pieces 41a, 41b are disposed above lower magnetic pole piece 40a. The top end of upper magnetic pole piece 41a is recessed from the air-bearing surface and has a structure recessed from the top end of upper magnetic pole piece 41b. By dividing the upper magnetic pole piece into pieces 41a and 41b, magnetic fluxes generated in the magnetic pole piece by the current flowing through coils 42 can be collected effectively to the top end, thereby improving the recording characteristics.

The writing head maybe a head for perpendicular recording having a main magnetic pole piece and an auxiliary magnetic pole piece.

Since the magnetic data written by the writing head can be read out stably at high output by using the read head of the invention for the magnetic head, and optimizing the magnetization film thickness product of the magnetic domain control film to a value defined in the invention relative to the geometrical track width, the magnetic disk apparatus can use a magnetic disk of a narrow track width and can attain high density magnetic recording.

Embodiment 12

Figure 13:
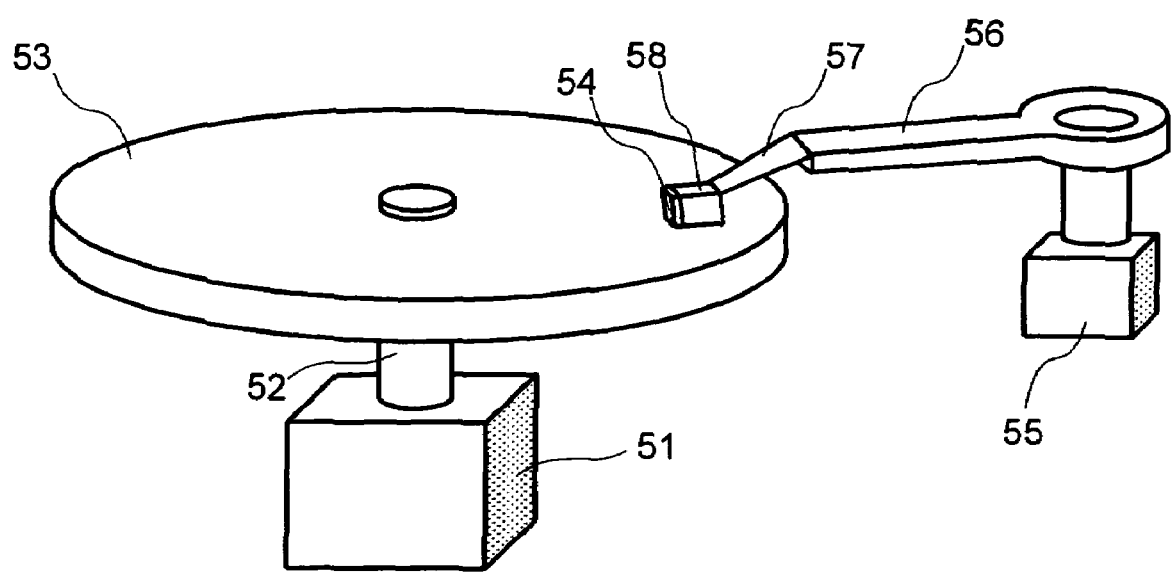
FIG. 13 is a view of an entire magnetic disk apparatus incorporated with a magnetic head having a magnetic domain control structure of the invention.

FIG. 13 shows a view of an entire magnetic disk apparatus incorporated with a magnetic head having a magnetic domain control structure of the present invention. A magnetic recording apparatus has a magnetic disk 53 for recording information mounted to a spindle 52 rotated by a spindle motor 51, a suspension 57 is connected with a rotary actuator arm 56 driven by a voice coil motor 55, suspension 57 holds a slider 58, and slider 58 is attached to move a magnetic head 54 to the disk surface. Magnetic head 54 writes and reads magnetic data in the tracks on the disk.

Since magnetic data on magnetic disk 53 can be recorded and reproduced stably at high output by optimizing the magnetization film thickness product of the magnetic domain control film relative to the geometrical track width by using magnetic head 54 of the invention for the magnetic disk apparatus, the magnetic disk apparatus can use a magnetic disk of narrow track width and attain high-density magnetic recording.

A magnetoresistive head that has no hysteresis in the transfer curve and provides strong output can be attained by using a magnetic domain control film having a magnetization film thickness product defined in the invention relative to the geometrical track width.

While the above is a complete description of specific embodiments of the invention, the above description should not be taken as limiting the scope of the invention as defined by the claims.

What is claimed is:

1. A magnetoresistive head comprising:
an antiferromagnetic layer;
a pinned layer formed on the antiferromagnetic layer with a magnetizing direction of the pinned layer being fixed;
a nonmagnetic layer formed on the pinned layer;
a free layer formed on the nonmagnetic layer;
a magnetic domain control film for magnetic domain control of the free layer;
and a pair of electrode films for supplying electric current to a stack of the antiferromagnetic layer, the pinned layer, the nonmagnetic layer, and the free layer;
wherein, when a width of the free layer as viewed from an air bearing surface is defined as a geometrical track width Twr_geo(nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 116 \leq Br \cdot t < 3.75 \cdot 10^{-1}x + 130 \text{ and } 40 \leq x < 160.$$

2. A magnetoresistive head comprising:
an antiferromagnetic layer;
a pinned layer formed on the antiferromagnetic layer with a magnetizing direction of the pinned layer being fixed;
a nonmagnetic layer formed on the pinned layer;
a free layer formed on the nonmagnetic layer;
a magnetic domain control film for magnetic domain control of the free layer; and
a pair of electrode films for supplying electric current to a stack of the antiferromagnetic layer, the pinned layer, the nonmagnetic layer, and the free layer;
wherein, when a width of the free layer as viewed from an air bearing surface is defined as a geometrical track width Twr_geo (nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 116 \leq Br \cdot t \leq -2.94 \cdot 10^{-4}x^3 + 8.54 \cdot 10^{-2}x^2 - 5.73x + 141,$$
$$Br \cdot t < 3.75 \cdot 10^{-1}x + 130, \text{ and } 40 \leq x < 160.$$

3. A magnetoresistive head comprising:
an antiferromagnetic layer;
a pinned layer formed on the antiferromagnetic layer with a magnetizing direction of the pinned layer being fixed;
a nonmagnetic layer formed on the pinned layer;
a free layer formed on the nonmagnetic layer;
a magnetic domain control film for magnetic domain control of the free layer; and
a pair of electrode films for supplying electric current to a stack of the antiferromagnetic layer, the pinned layer, the nonmagnetic layer, and the free layer;
wherein, when a width of the free layer as viewed from an air bearing surface is defined as a geometrical track width Twr_geo(nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 151 \leq Br \cdot t < 3.75 \cdot 10^{-1}x + 165 \text{ and } 40 \leq x < 160.$$

4. A magnetoresistive head comprising:
an antiferromagnetic layer;
a pinned layer formed on the antiferromagnetic layer with a magnetizing direction of the pinned layer being fixed;
a nonmagnetic layer formed on the pinned layer;
a free layer formed on the nonmagnetic layer;
a magnetic domain control film for magnetic domain control of the free layer; and
a pair of electrode films for supplying electric current to a stack of the antiferromagnetic layer, the pinned layer, the nonmagnetic layer, and the free layer;
wherein, when a width of the free layer as viewed from an air bearing surface is defined as a geometrical track width Twr_geo(nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 151 \leq Br \cdot t \leq -2.94 \cdot 10^{-4}x^3 + 8.54 \cdot 10^{-2}x^2 - 5.73x + 176,$$
$$Br \cdot t < 3.75 \cdot 10^{-1}x + 165, \text{ and } 40 \leq x < 160.$$

5. A magnetoresistive head comprising:
an underlying layer;
a free layer formed on the underlying layer;
a magnetic domain control film for magnetic domain control of the free layer;
a nonmagnetic layer formed on the free layer;
a pinned layer formed on the nonmagnetic layer with a magnetizing direction of the pinned layer being fixed;
an antiferromagnetic layer fixing magnetization of the pinned layer; and
a pair of electrode films for supplying electric current to a stack of the underlying layer, the free layer, the nonmagnetic layer, the pinned layer and the antiferromagnetic layer;
wherein, when a width of the free layer as viewed from an air bearing surface is defined as a geometrical track width Twr_geo(nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 116 \leq Br \cdot t < 3.75 \cdot 10^{-1}x + 130 \text{ and } 40 \leq x < 160.$$

6. A magnetoresistive head comprising:
an underlying layer;
a free layer formed on the underlying layer;
a magnetic domain control film for magnetic domain control of the free layer;
a nonmagnetic layer formed on the free layer;
a pinned layer formed on the nonmagnetic layer with a magnetizing direction of the pinned layer being fixed;
an antiferromagnetic layer fixing magnetization of the pinned layer; and
a pair of electrode films for supplying electric current to a stack of the underlying layer, the free layer, the nonmagnetic layer, the pinned layer and the antiferromagnetic layer;
wherein, when a width of the free layer as viewed from an air bearing surface is defined as a geometrical track width Twr_geo(nm) and expressed as x, a magnetization film thickness product $Br \cdot t(G \cdot \mu m)$ of the magnetic domain control film and x satisfy the following:

$$-2.94 \cdot 10^{-4}x^3 + 8.54 \cdot 10^{-2}x^2 - 5.73x + 116 \leq Br \cdot t \leq -2.94 \cdot 10^{-4}x^3 + 8.54 \cdot 10^{-2}x^2 - 5.73x + 141,$$
$$Br \cdot t < 3.75 \cdot 10^{-1}x + 130, \text{ and } 40 \leq x < 160.$$

7. A magnetoresistive head comprising:
an underlying layer;
a free layer formed on the underlying layer;
a magnetic domain control film for magnetic domain control of the free layer;
a nonmagnetic layer formed on the free layer;
a pinned layer formed on the nonmagnetic layer with a magnetizing direction of the pinned layer being fixed;
an antiferromagnetic layer fixing magnetization of the pinned layer; and
a pair of electrode films for supplying electric current to a stack of the underlying layer, the free layer, the nonmagnetic layer, the pinned layer and the antiferromagnetic layer;
wherein, when a width of the free layer as viewed from an air bearing surface is defined as a geometrical track width Twr_geo(nm) and expressed as x, a magnetization film thickness product Br·t(G·µm) of the magnetic domain control film and x satisfy the following:

$-2.94 \cdot 10^{-4}x^3 + 8.54 \cdot 10^{-2}x^2 - 5.73x + 151 \leq Br \cdot t < 3.75 \cdot 10^{-1}x + 165$ and $40 \leq x < 160$.

8. A magnetoresistive head comprising:
an underlying layer;
a free layer formed on the underlying layer;
a magnetic domain control film for magnetic domain control of the free layer;
a nonmagnetic layer formed on the free layer;
a pinned layer formed on the nonmagnetic layer with a magnetizing direction of the pinned layer being fixed;
an antiferromagnetic layer fixing magnetization of the pinned layer; and
a pair of electrode films for supplying electric current to a stack of the underlying layer, the free layer, the nonmagnetic layer, the pinned layer and the antiferromagnetic layer;
wherein, when a width of the free layer as viewed from an air bearing surface is defined as a geometrical track width Twr_geo(nm) and expressed as x, a magnetization film thickness product Br·t(G·µm) of the magnetic domain control film and x satisfy the following:

$-2.94 \cdot 10^{-4}x^3 + 8.54 \cdot 10^{-2}x^2 - 5.73x + 151 \leq Br \cdot t \leq -2.94 \cdot 10^{-4}x^3 + 8.54 \cdot 10^{-2}x^2 - 5.73x + 176$, $Br \cdot t < 3.75 \cdot 10^{-1}x + 165$, and $40 \leq x < 160$.

9. A magnetic head having a magnetoresistive head according to any one of claims 1 to 8 as a reading head and having a writing head for perpendicular recording.

10. A magnetoresistive head according to any one of claims 1 to 8 wherein the magnetic domain control film comprises a magnetic film made of a CoPt alloy comprising at least 4 to 30 at % of Pt, or a CoCrPt alloy, or CoCrPt—ZrO$_2$ or CoCrPt—SiO$_2$ further comprising 2 to 15 at % of Cr.

11. A magnetoresistive head according to any one of claims 1 to 8, wherein the magnetic domain control film comprises a stacked film in which at least two or more magnetic films are antiferromagnetically coupled by way of a nonmagnetic film comprising Ru, Cr, Ir, Rh, Os, Re, Au, Ag, Cu or an alloy thereof, and a magnetic film as a constituent element thereof is a magnetic film comprising a CoPt alloy comprising at least 4 to 30 at % of Pt, or a CoCrPt alloy, or CoCrPt—ZrO$_2$ or CoCrPt—SiO$_2$ further comprising 2 to 15 at % of Cr or a magnetic film having soft magnetic property containing Fe or Ni.

12. A magnetoresistive head according to any one of claims 1 to 8, wherein the magnetic domain control film is a stacked film having two-layers of magnetic films antiferromagnetically coupled by way of a nonmagnetic film, and the magnetization film thickness product Br·t of the magnetic domain control film is defined as $Br \cdot t = Br1 \cdot t1 - Br2 \cdot t2$ assuming residual magnetic flux densities of the two layers of magnetic layers as Br1 and Br2, respectively, and film thicknesses thereof as t1 and t2, respectively.

13. A magnetoresistive head according to any one of claims 1 to 8, wherein the magnetic domain control film is a stacked film having three layers of magnetic films and antiferromagnetically coupled by way of a nonmagnetic film, and the magnetization film thickness product Br·t of the magnetic domain control film is defined as $Br \cdot t = Br1 \cdot t1 - Br2 \cdot t2 + Br3 \cdot t3$ assuming residual magnetic flux densities of the three magnetic layers as Br1, Br2, and Br3, respectively, and the film thicknesses thereof as t1, t2, and t3, respectively.

14. A magnetic head having a magnetoresistive head according to any one of claims 1 to 8 having as a reading head and having a writing head for in-plane recording.

15. A magnetoresistive head comprising:
an insulative layer formed on a substrate;
an antiferromagnetic layer formed on the insulative layer;
a pinned layer formed on the antiferromagnetic layer with a magnetizing direction of the pinned layer being fixed;
a nonmagnetic layer formed on the pinned layer;
a free layer formed on the nonmagnetic layer;
a pair of electrode films for supplying electric current to a stack of the antiferromagnetic layer, the pinned layer, the nonmagnetic layer and the free layer; and
an electrode underlying film;
wherein the electrode underlying film is formed directly on the insulative layer in a case where a width of the free layer as viewed from an air bearing surface is defined as Twr_geo (nm) and expressed as x, and x–40.

* * * * *